United States Patent
Negoro et al.

[11] Patent Number: 5,976,731
[45] Date of Patent: Nov. 2, 1999

[54] NON-AQUEOUS LITHIUM ION SECONDARY BATTERY

[75] Inventors: Masayuki Negoro; Jiro Tsukahara; Hiroshi Ishizuka, all of Kanagawa, Japan

[73] Assignee: Fuji Photo Film Co., Ltd., Kanagawa, Japan

[21] Appl. No.: 08/922,528

[22] Filed: Sep. 3, 1997

[30] Foreign Application Priority Data

Sep. 3, 1996 [JP] Japan .................................. 8-233467
Nov. 7, 1996 [JP] Japan .................................. 8-295054

[51] Int. Cl.⁶ .................................................. H01M 10/40
[52] U.S. Cl. ........................ 429/328; 429/332; 429/336; 429/339
[58] Field of Search .................... 429/328, 332, 429/336, 339

[56] References Cited

U.S. PATENT DOCUMENTS 4,489,144  12/1984  Clark ........................................ 429/336
5,525,443  6/1996  Okuno et al. ............................ 429/332
5,731,106  3/1998  Tsutumi et al. ......................... 429/332
5,750,284  5/1998  Pendalwar et al. ................. 429/332 X

*Primary Examiner*—Stephen Kalafut
*Attorney, Agent, or Firm*—Sughrue, Mion, Zinn, Macpeak & Seas, PLLC

[57] ABSTRACT

In a non-aqueous lithium ion secondary battery comprising a positive electrode and a negative electrode which are capable of reciprocally receiving and releasing lithium ions, a non-aqueous electrolyte solution containing a lithium salt in a non-aqueous solvent and a separator in a sealed case, the negative electrode comprises an amorphous calcogen compound or an amorphous metal oxide, and the non-aqueous electrolyte solution further contains at least one amine compound selected from the group consisting of a carbazole compound, a phenothiazine compound, a phenoxazine compound, an acridine compound, a dibenzoazepine compound and a phenazine compound. If the non-aqueous solvent comprises a non-cyclic carbonate compound and a cyclic carbonate compound, the amine compound can be a triarylamine.

14 Claims, 1 Drawing Sheet

FIGURE
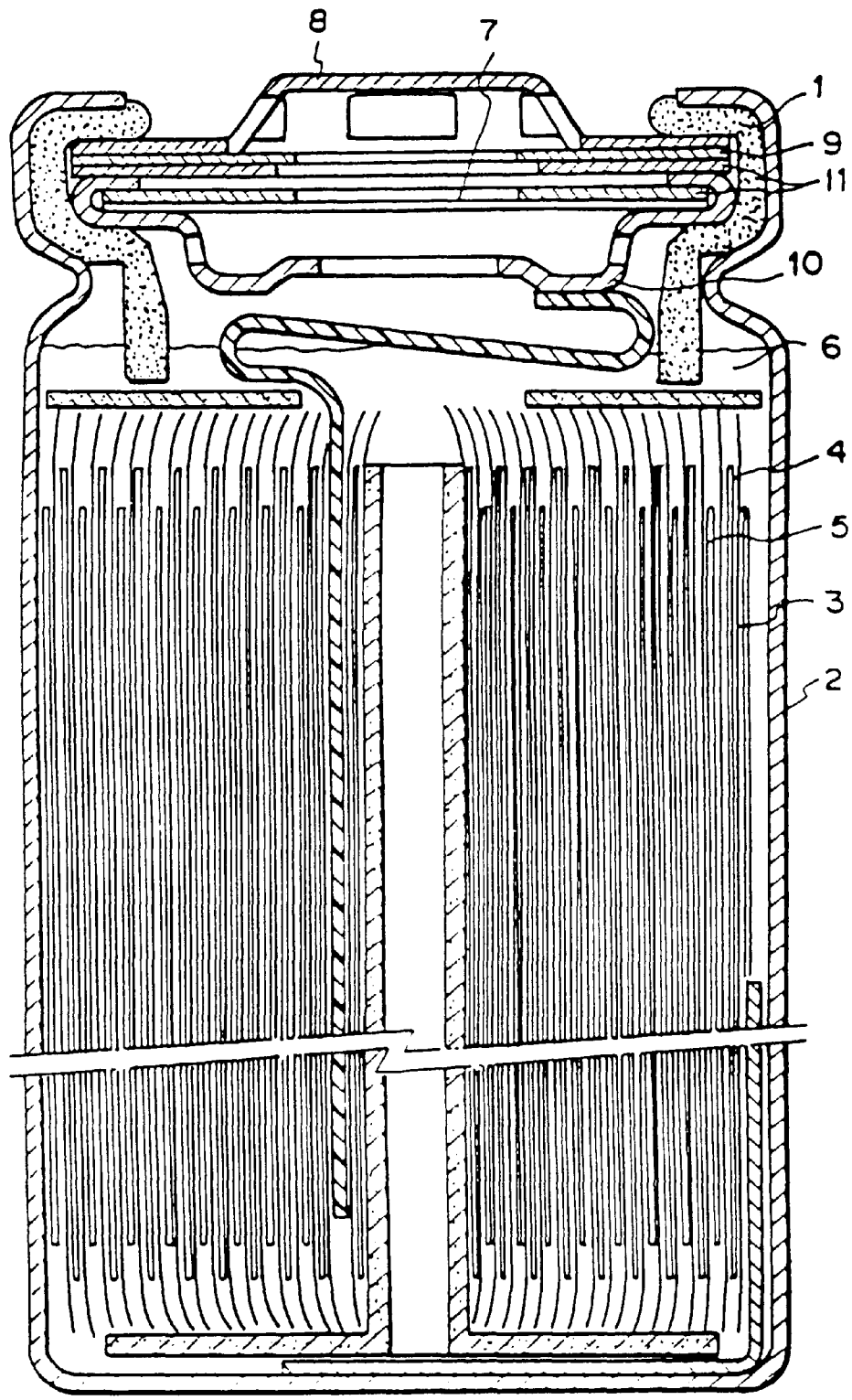

NON-AQUEOUS LITHIUM ION SECONDARY BATTERY

FIELD OF THE INVENTION

This invention relates to a non-aqueous lithium ion secondary battery and, in particular, relates to a non-aqueous lithium ion secondary battery which shows improved charge-discharge cycle characteristics.

BACKGROUND OF THE INVENTION

As a material of negative electrode of a non-aqueous lithium secondary battery, a lithium metal or lithium alloy has been generally employed. The lithium metal or lithium alloy, however, has a disadvantageous feature in that a lithium metal deposits on the electrode in the branched or tree-like form to give dendrite and produces an internal short circuit or easily ignites due to extremely high activity of the deposited dendrite.

In order to obviate such troubles, a fired carbonaceous material which can reciprocally receive and release lithium ions was developed and has been employed in practice for preparing a negative electrode. This material has a disadvantageous small density and therefore it only gives a relatively low capacity. Further, since the fired carbonaceous material per se has electroconductivity, a lithium metal may deposition the carbonaceous negative electrode in the course of over-charging or rapid charging.

EP-A-615,296 and Japanese Patent Provisional Publications No. H5-174818, No. H6-60867, No. H6-275267, No. H6-325765 and No. H6-338324 disclose that a non-aqueous lithium ion secondary battery showing a high capacity and giving a discharge potential as high as 3 to 3.6 volts can be prepared by the use of an oxide of Sn, V, Si, B or Zr or an oxide of a combination of these metals as the electrode forming-material. In more detail, the negative electrode comprising the oxide of Sn, V, Si, B or Zr, or the oxide of combination of these metals can give a non-aqueous secondary battery which has a discharge potential as high as 3 to 3.6 volts and a large discharge capacity, and produces almost no dendrite under the practically confronting conditions resulting in enhancement of safety.

Journal of Power Sources, 39(1992), 163–178, discloses that highly stable solutions of 1,3-dioxolane with $LiClO_4$ or $LiAsF_6$ preferably erployable for secondary lithium batteries may be prepared by the use of tertiary amine derivatives such as trialkylamines such as triethylamine, tripropylamine, tributylamine and trioctylamine and triarylamines such as tribenzylamine, triphenylamine, trimethylpiperidine and trimethylmorpholine.

Japanese Patent Provisional Publication No. H6-333598 discloses that a lithium secondary battery which employs an electrolyte solution containing a trialkylamine or a triarylamine shows good charge-discharge cycle characteristics.

SUMMARY OF THE INVENTION

It is a primary object of the present invention to provide a non-aqueous lithium ion secondary battery which gives a large discharge capacity as well as good charge-discharge cycle characteristics.

It is another object of the invention to provide a non-aqueous lithium ion secondary battery which gives a large discharge capacity, good charge-discharge cycle characteristics, and further a high discharge potential.

In one aspect, the present invention resides in a non-aqueous lithium ion secondary battery comprising a positive electrode and a negative electrode which are capable of reciprocally receiving and releasing lithium ions, a non-aqueous electrolyte solution containing a lithium salt in a non-aqueous solvent and a separator in a sealed case, wherein the non-aqueous electrolyte solution further contains at least one amine compound selected from the group consisting of a carbazole compound, a phenothiazine compound, a phenoxazine compound, an acridine compound, a dibenzoazepine compound and a phenazine compound in an amount of more than 0.0001 mole/L but not more than 0.1 mole/L.

In another aspect, the present invention resides in a non-aqueous lithium ion secondary battery comprising a positive electrode and a negative electrode which are capable of reciprocally receiving and releasing lithium ions, a non-aqueous electrolyte solution containing a lithium salt in a non-aqueous solvent and a separator in a sealed case, wherein the non-aqueous electrolyte solution further contains at least one triarylamine compound in an amount of more than 0.0001 mole/L but not more than 0.1 mole/L and the non-aqueous solvent comprises a non-cyclic carbonate compound and a cyclic carbonate compound in a weight ratio of 1/9 to 9/1.

In the non-aqueous lithium ion secondary battery of the invention, the negative electrode preferably comprises an amorphous calcogen compound or metal oxide comprising one or more atoms selected from those belonging to Groups 1, 2, 13, 14 and 15 of Periodic Table.

BRIEF DESCRIPTION OF THE DRAWINGS

The FIGURE is a schematic section of a representative lithium ion secondary battery according to the invention.

PREFERRED EMBODIMENTS OF THE INVENTION

The attached FIGURE illustrates the constitution of one of non-aqueous lithium ion secondary battery of cylinder type. In the FIGURE, 1 denotes a gasket made of polypropylene resin; 2 denotes a container of battery (i.e., battery can or case which also serves as the terminal of negative electrode); 3 denotes a separator; 4 denotes a negative electrode sheet; 5 denotes a positive electrode sheet; 6 denotes a non-aqueous electrolyte solution; 7 denotes an explosion preventive safety valve; 8 denotes a cap (i.e., battery cap which also serves as the terminal of positive electrode); 9 denotes a PCT element; 10 denotes an internal cap; and 10 denotes a ring.

The non-aqueous lithium ion secondary battery of the invention can be manufactured to give secondary batteries of various types such as cylinder, coin, button, sheet, and square.

In one aspect, the present invention is characteristic in that the non-aqueous electrolyte solution of a non-aqueous lithium ion secondary battery contains at least one amine compound selected from the group consisting of a carbazole compound, a phenothiazine compound, a phenoxazine compound, an acridine compound, a dibenzoazepine compound and a phenazine compound. The carbazole compound, the phenothiazine compound, the phenoxazine compound, the acridine compound, the dibenzoazepine compound and the phenazine compound are preferably represented by the following formulas (1), (2), (3), (4), (5) and (6), respectively.

Formula (1) for Carbazole Compound

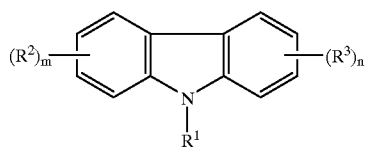

Formula (2) for Phenothiazine compound

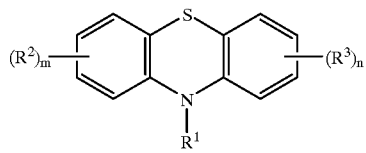

Formula (3) for Phenoxazine Compound

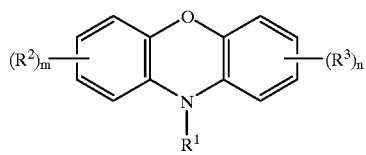

Formula (4) for Acridine compound

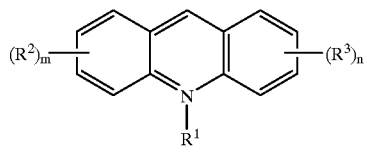

Formula (5) for Dibenzoazepine Compound

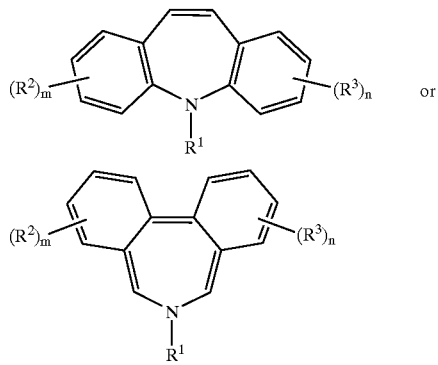

or

Formula (6) for Phenazine Compound

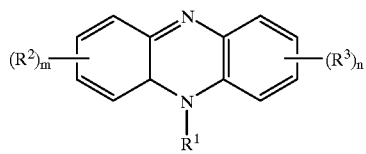

In each of the formulas (1) to (6), $R^1$ represents an aryl or aralkyl group; each of $R^2$ and $R^3$ independently represents an alkyl, aralkyl, aryl or alkoxy group; each of m and n independently represents an integer of 0 to 4.

In more detail, $R^1$ preferably represents an aryl group having 6 to 14 carbon atoms such as phenyl, naphthyl or anthryl or an aralkyl group having 7 to 16 carbon atoms such as benzyl, phenylethyl or naphtylmethyl. The aryl or aralkyl group may have one or more substituents such as unsubstituted or substituted alkyl groups (e.g., methyl, ethyl, n-propyl, isopropyl, n-butyl, pentyl, hexyl, heptyl, octyl, nonyl, 2-chloroethyl, 3-methoxyethyl, methoxyethoxyethyl, 2-hydroxyethyl, 3-hydroxypropyl, and trifluoromethyl), cycloalkyl groups (e.g., cyclopentyl, cyclohexyl and cycloheptyl), alkoxy groups (e.g., methoxy, ethoxy, n-propoxy and n-butoxy), alkenyl groups, alkynyl groups, aralkyl groups, aryl groups, halogen atoms, cyano group, nitro group, hydroxyl group, formyl group, aryloxy groups, alkylthio groups, arylthio groups, acyloxy groups, sulfonyloxy groups, amino group, alkylamine groups, arylamino groups, carbondiamido group, sulfonamido group, oxycarbonylamino group, oxysulfonylamino group, ureido group, acyl group, oxycarbonyl group, carbamoyl group, sulfonyl group, sulfinyl group, oxysulfinyl group, sulfamoyl group, carbonic acid group or its salt, sulfonic acid group or its salt, phosphonic acid or its salt, and heterocyclic groups.

Examples of the carbazole compounds, phenothiazine compounds and phenoxazine compounds are illustrated below. The compounds of E-1 to E-44 belong to the carbazole compounds, the compounds of F-1 to F-24 belong to the phenothiazine compounds, and the coppmpounds of G-1 to G-24 belong to the phenoxazine compounds.

E-1

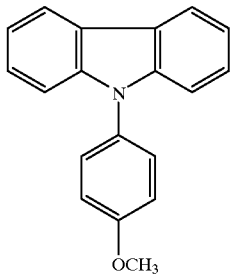

E-2

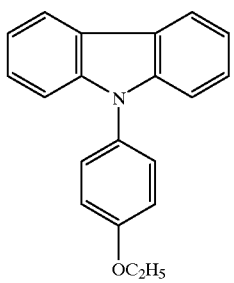

-continued
E-3 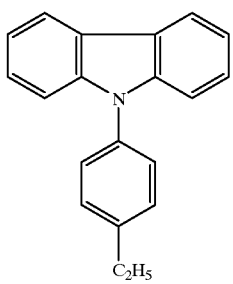
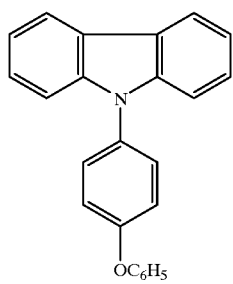
E-8
E-4 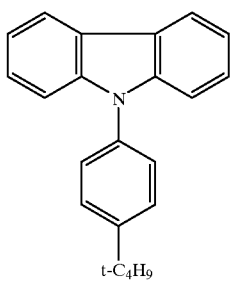
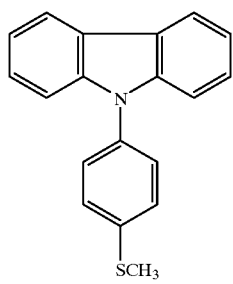
E-9
E-5 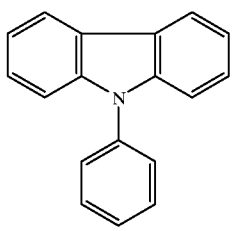
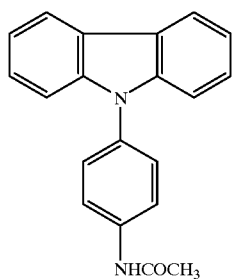
E-10
E-6 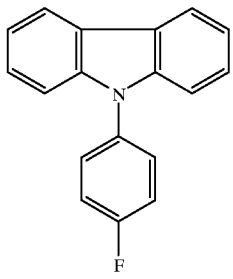
E-11
E-7 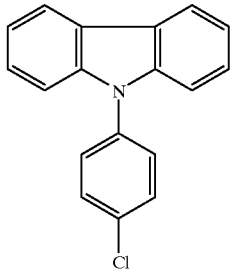
E-12

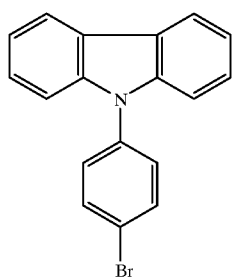
E-13
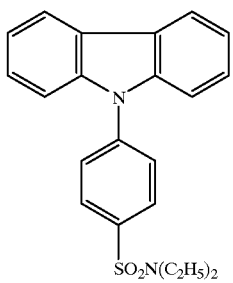
E-18
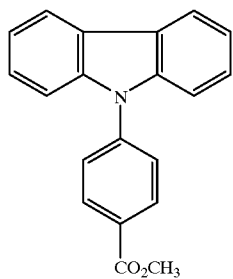
E-14
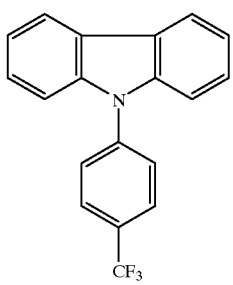
E-19
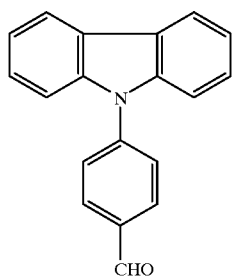
E-15
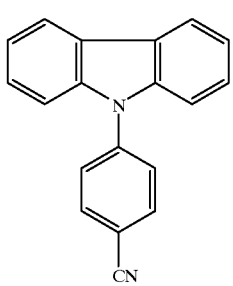
E-20
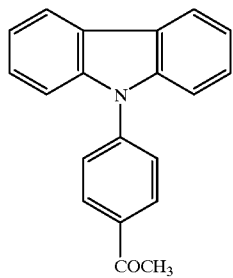
E-16
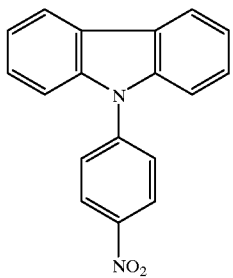
E-21
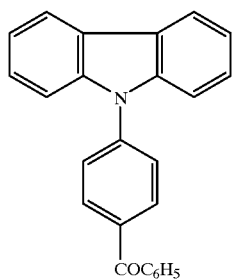
E-17
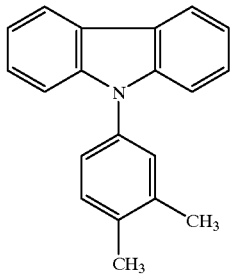
E-22

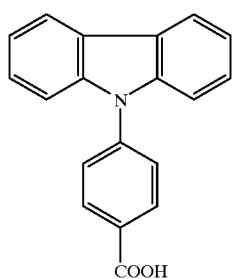 E-23
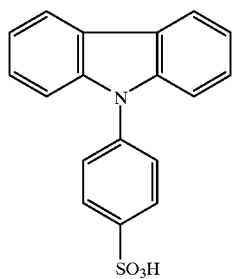 E-24
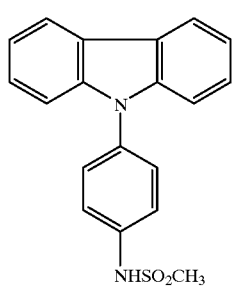 E-25
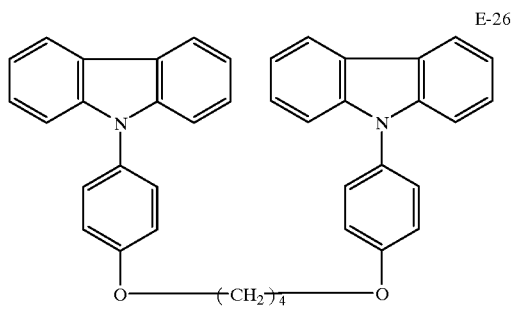 E-26
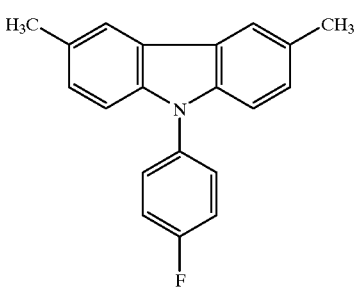 E-27
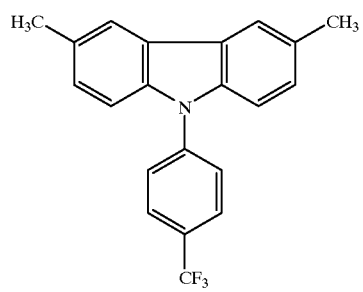 E-28
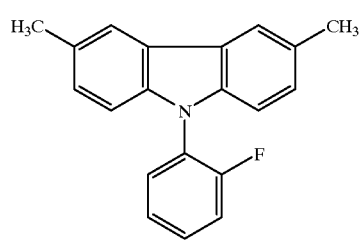 E-29
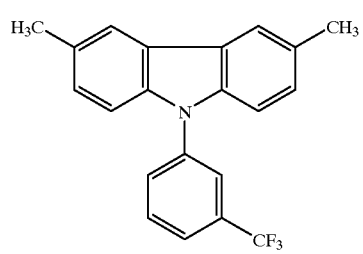 E-30
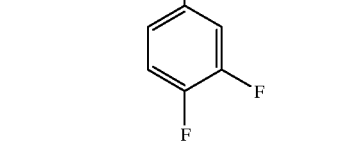 E-31
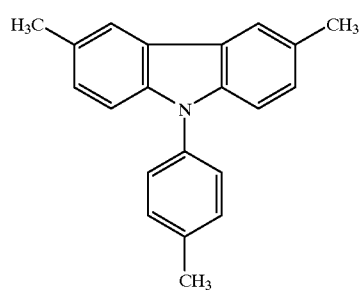 E-32

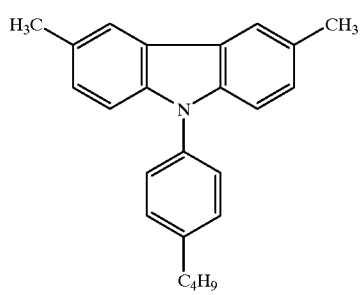 E-33
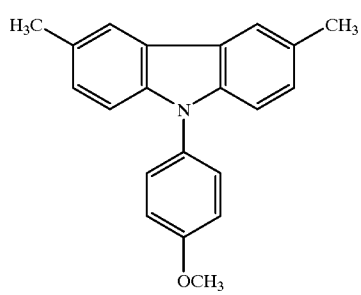 E-34
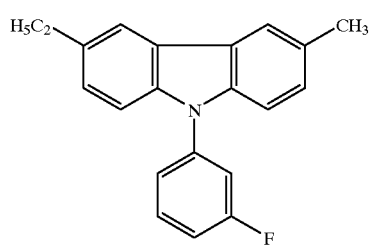 E-35
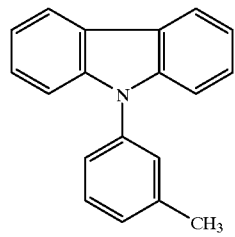 E-36
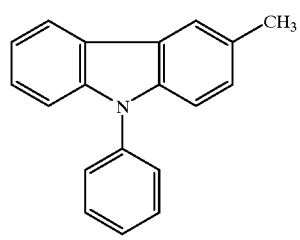 E-37
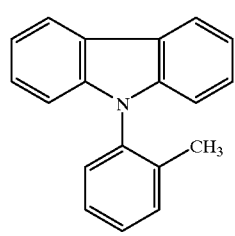 E-38
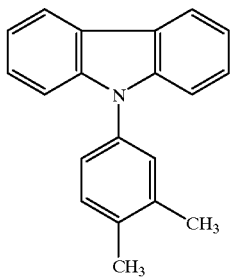 E-39
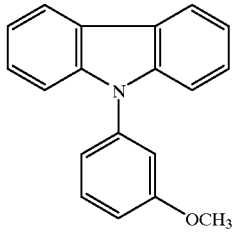 E-40
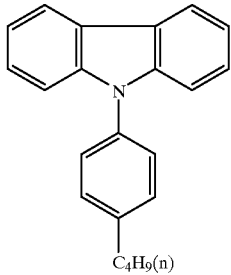 E-41
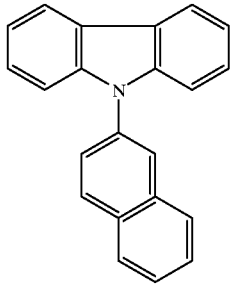 E-42
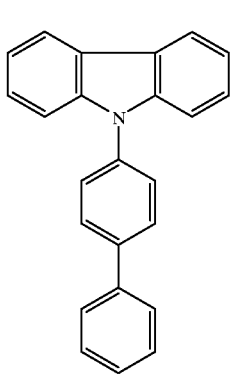 E-43

-continued
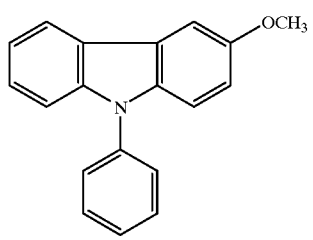
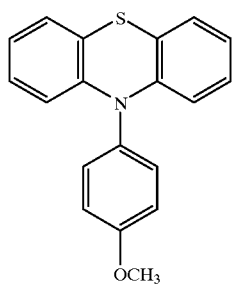
F-1
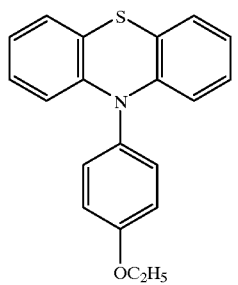
F-2
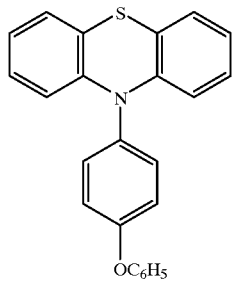
F-3
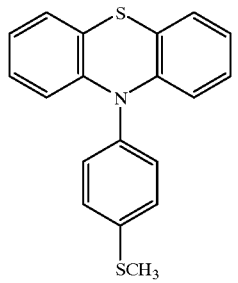
F-4
-continued
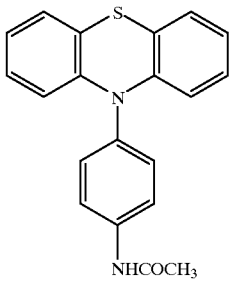
F-5
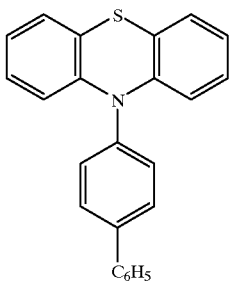
F-6
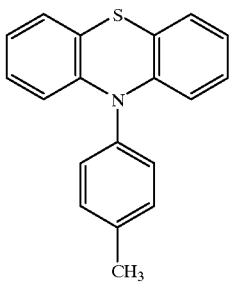
F-7
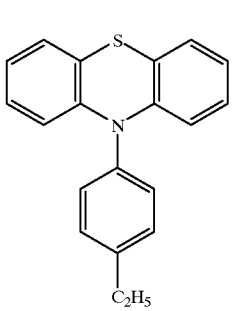
F-8
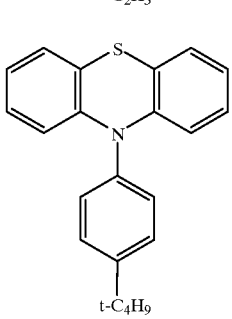
F-9

-continued

F-10: 10-phenyl-10H-phenothiazine

F-11: 10-(4-fluorophenyl)-10H-phenothiazine

F-12: 10-(4-chlorophenyl)-10H-phenothiazine

F-13: 10-(4-bromophenyl)-10H-phenothiazine

F-14: 10-[4-(methoxycarbonyl)phenyl]-10H-phenothiazine (CO₂CH₃ substituent)

F-15: 10-(4-formylphenyl)-10H-phenothiazine (CHO substituent)

F-16: 10-(4-acetylphenyl)-10H-phenothiazine (COCH₃ substituent)

F-17: 10-(4-benzoylphenyl)-10H-phenothiazine (COC₆H₅ substituent)

F-18: 10-[4-(N,N-diethylsulfamoyl)phenyl]-10H-phenothiazine (SO₂N(C₂H₅)₂ substituent)

F-19: 10-[4-(trifluoromethyl)phenyl]-10H-phenothiazine (CF₃ substituent)

F-20
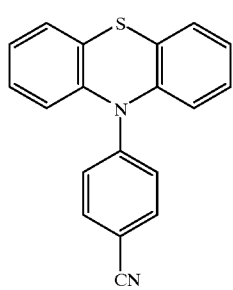
F-21
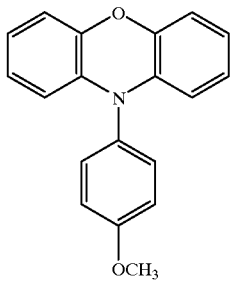
F-22
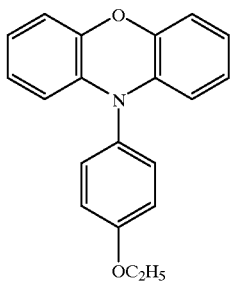
F-23
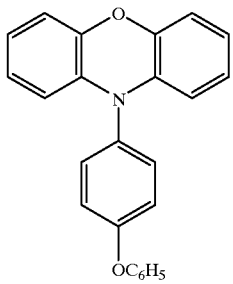
F-24
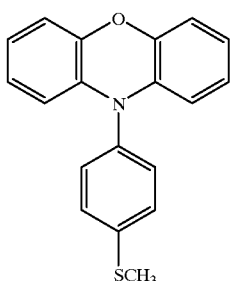
G-1
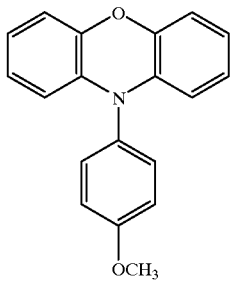
G-2
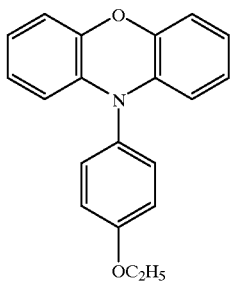
G-3
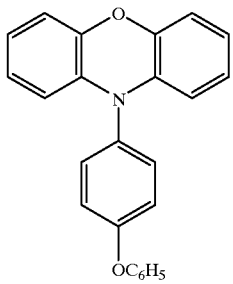
G-4
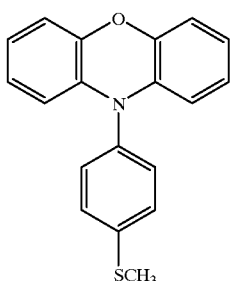
G-5
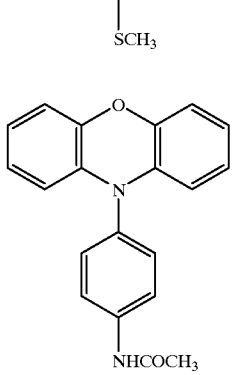

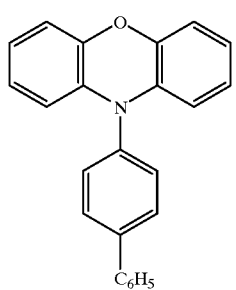
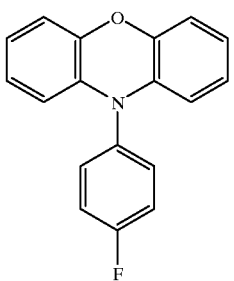
G-6
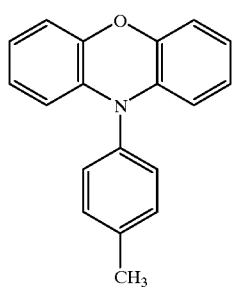
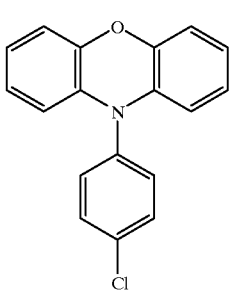
G-7
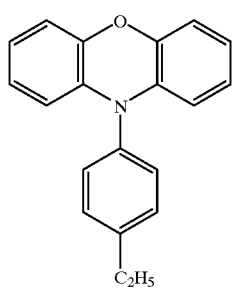
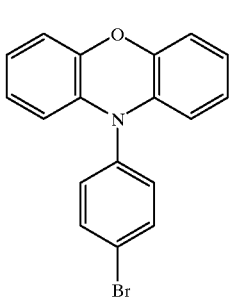
G-8
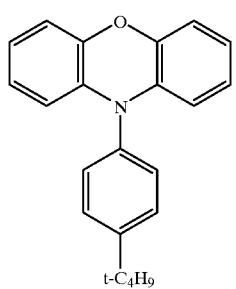
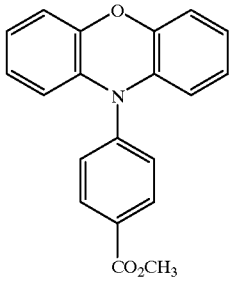
G-9
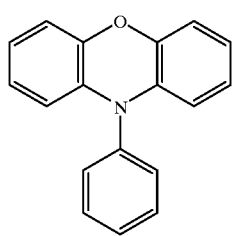
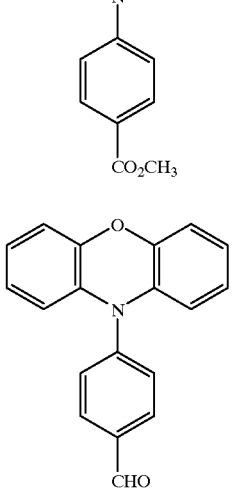
G-10

G-16 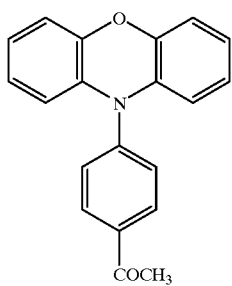

G-17 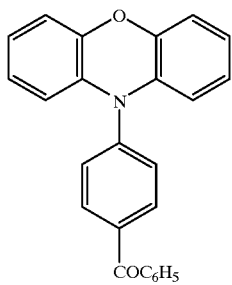

G-18 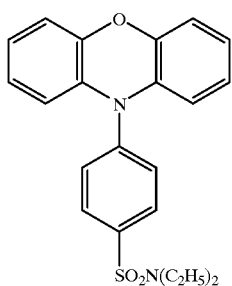

G-19 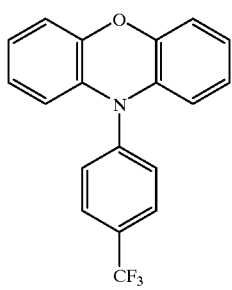

G-20 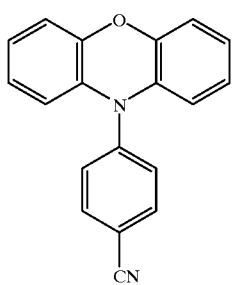

G-21 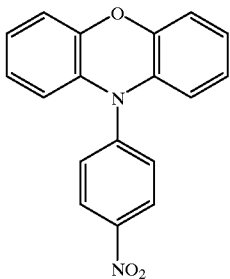

G-22 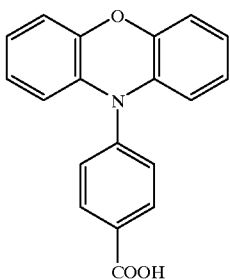

G-23 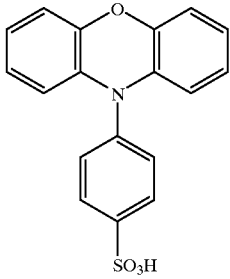

G-24 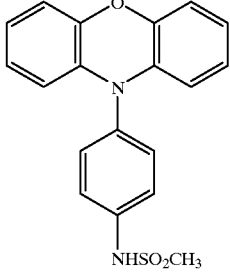

The above-mentioned amine compound is incorporated into the non-aqueous electrolyte solution in an amount of more than 0.0001 mole/L but not more than 0.1 mole/L, preferably in an amount of 0.001 to 0.1 mole/L.

The non-aqueous electrolyte solution comprises a non-aqueous solvent and a lithium salt (that is, supporting salt) soluble in the non-aqueous solvent.

Examples of the non-aqueous solvents include non-protonic organic solvents such as propylene carbonate, ethylene carbonate, butyrene carbonate, dimethyl carbonate, diethyl carbonate, methyl ethyl carbonate, γ-butyrolactone, methyl formate, methyl acetate, 1,2-dimethoxyethane, tetrahydrofuran, 2-methyltetrahydrofuran, dimethylsulfoxide, 1,3-dioxolane, formamide, dimethylformamide, dioxolane, dioxane, acetonitrile, nitromethane, ethyl monoglyme, phosphoric acid triester, trimethoxymethane, dioxolane derivatives, sulforane, 3-methyl-2-oxazolinone, propylene carbonate derivatives, ethyl ether, and 1,3-propane sultone. These solvents can be employed singly or in combination. The carbonate-type solvents are preferred. Particularly preferred is a combination of a cyclic carbonate and a non-cyclic carbonate in a weight ratio of 1/9 to 9/1. Examples of the cyclic carbonates include ethylene carbonate and propylene carbonate. Examples of the non-cyclic carbonates include diethyl carbonate, dimethyl carbonate, and methyl ethyl carbonate. Particularly preferred is a combination of ethylene carbonate and a non-cyclic carbonate.

Examples of the lithium salts include $LiBCl_4$, $LiBF_4$, $LiPF_6$, $LiCF_3SO_3$, $LiCF_3CO_2$, $LiAsF_6$, $LiSbF_6$, $LiB_{10}Cl_{10}$, lower aliphatic carboxylic acid lithium salts, $LiAlC_4$, $LiCl$, $LiBr$, $LiI$, chloroborane lithium, and lithium tetraphenylborate. The lithium salts can be employed singly or in combination. $LiBF_4$ and $LiPF_6$ are preferred. Most preferred is a combination of $LiBF_4$ and $LiPF_6$.

The amount of the aforementioned amine compound incorporated into the non-aqueous solution preferably is in an amount of 0.001 to 10 weight % (most preferably 0.001 to 5 weight %) based on the amount of the lithium salt.

If the non-aqueous solvent is a combination of a cyclic carbonate and a non-cyclic carbonate in a weight ratio of 1/9 to 9/1, particularly the combination of ethylene carbonate and a non-cyclic carbonate, the amine compound can be a triarylamine compound. The triarylamine compound is represented by the following formula:

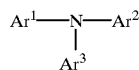

in which each of $Ar^1$, $Ar^2$ and $Ar^3$ independently represents an aryl group which may have one or more substituents. The aryl group is used to mean a cyclic group which satisfies the Hückel's $(4n+2)\pi$ electrons principle. Examples of the aryl groups include aromatic hydrocarbon groups such as phenyl, naphthyl, and anthranyl and aromatic heterocyclic groups such as furyl, thienyl, pyridyl and indolyl. Examples of the substituents are those described in the above for the amine compounds.

Examples of the triarylamine compounds are illustrated below.

A-1

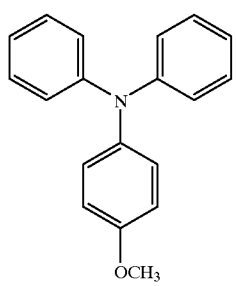

A-2

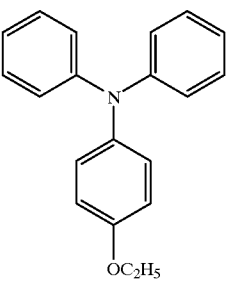

A-3

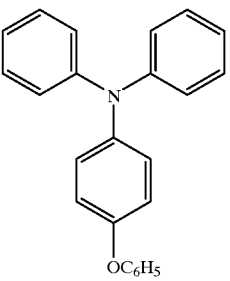

A-4

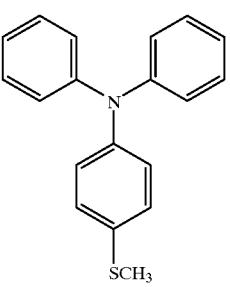

A-5

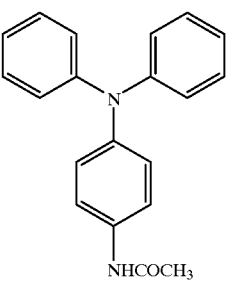

A-6

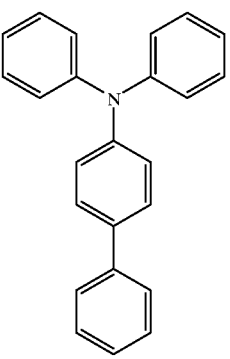

-continued
A-7 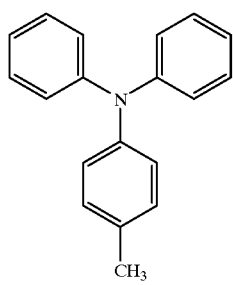 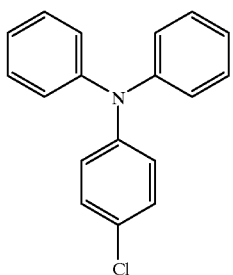 A-12
A-8 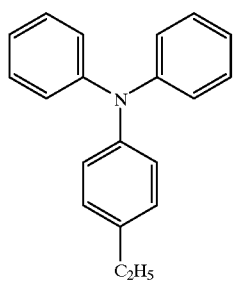 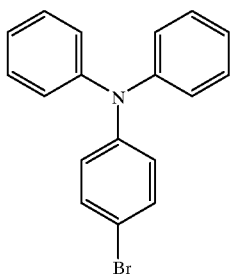 A-13
A-9 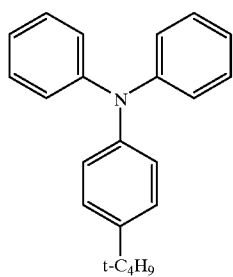 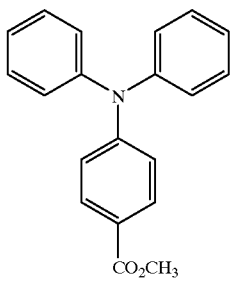 A-14
A-10 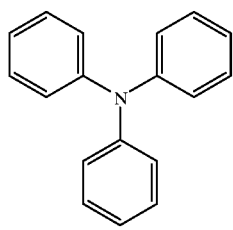 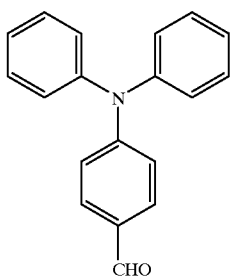 A-15
A-11 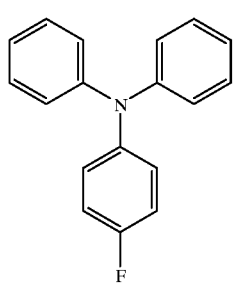 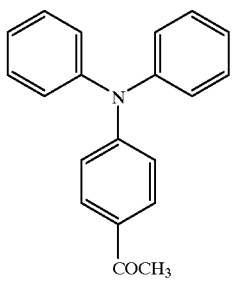 A-16

-continued
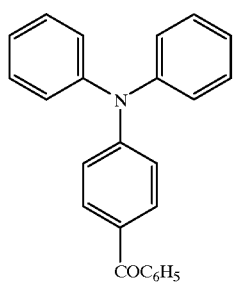
A-17
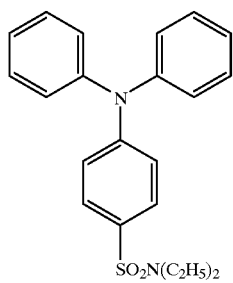
A-18
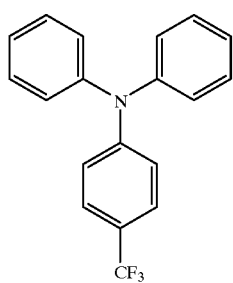
A-19
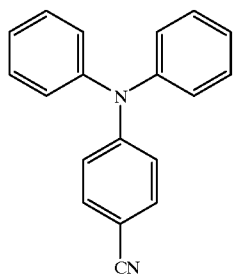
A-20
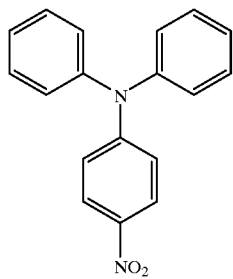
A-21
-continued
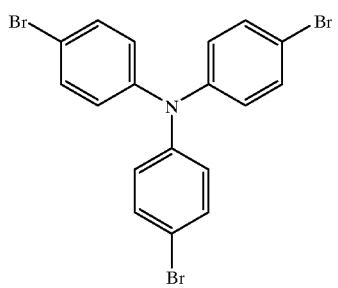
A-22
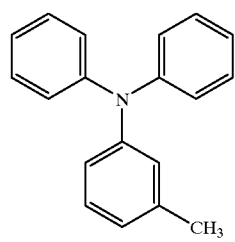
A-23
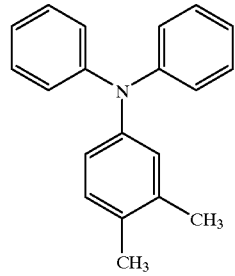
A-24
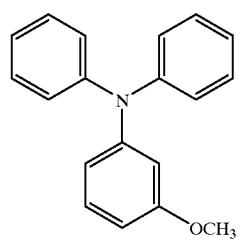
A-25
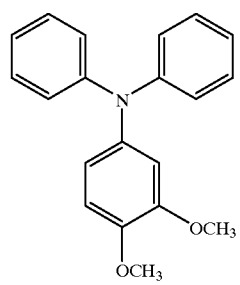
A-26
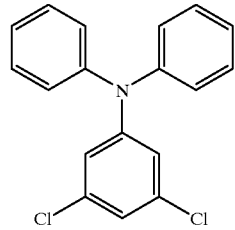
A-27

A-28
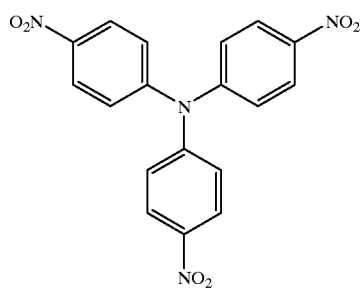
A-29
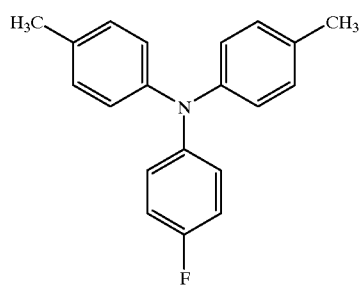
A-30
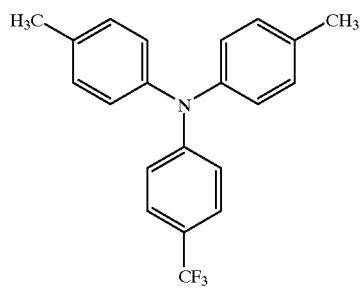
A-31
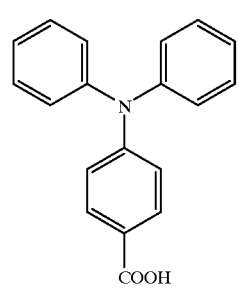
A-32
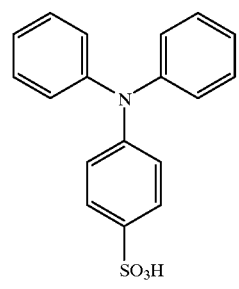
A-33
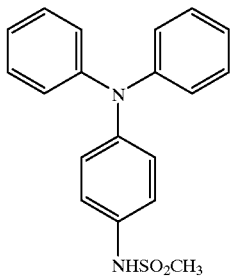
A-34
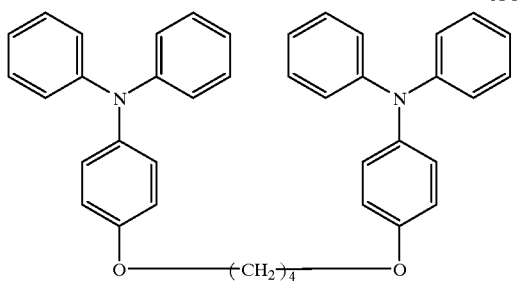
A-35
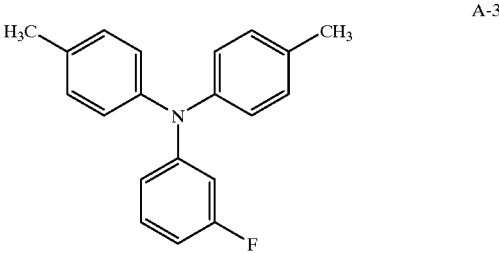
A-36
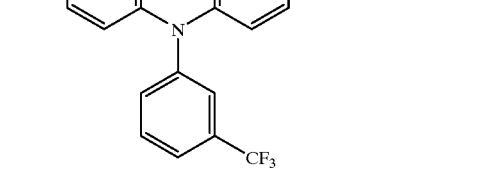
A-37
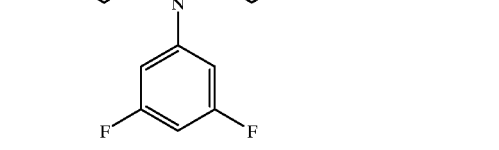
A-38
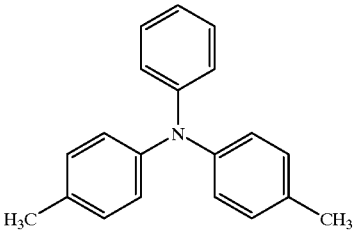

A-39 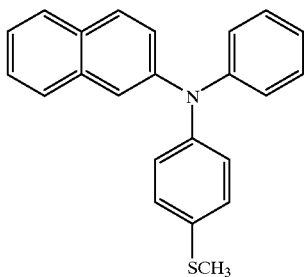
B-4
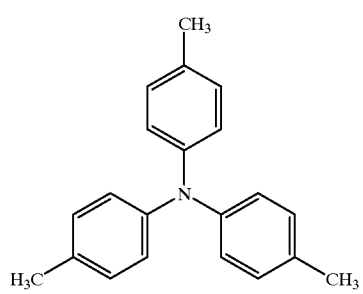
A-40 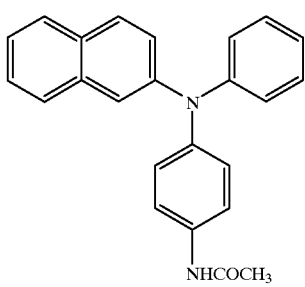
B-5
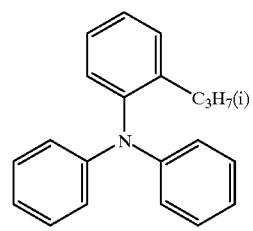
B-1 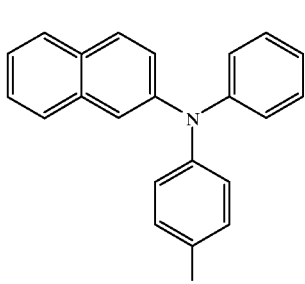
B-6
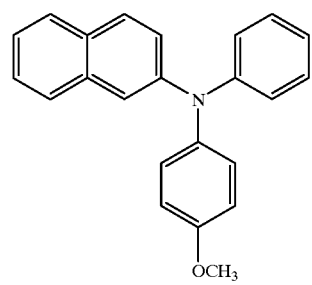
B-2 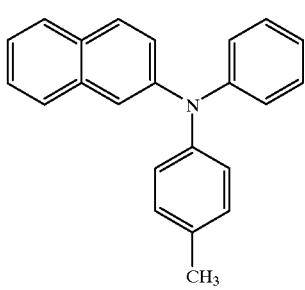
B-7
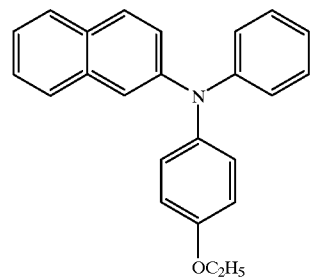
B-3 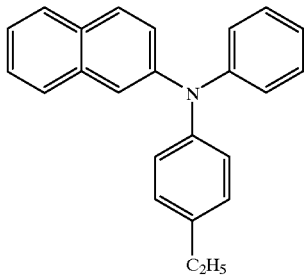
B-8
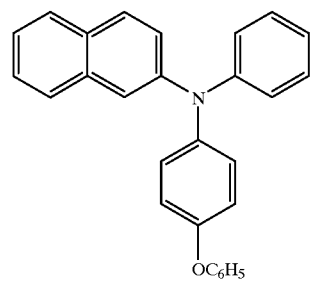

-continued
B-9
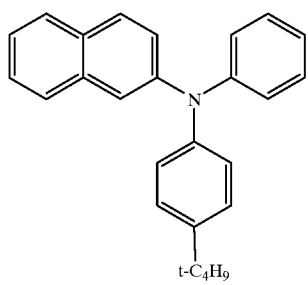
B-10
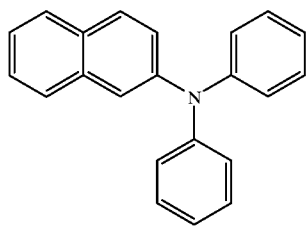
B-11
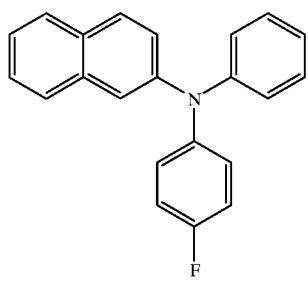
B-12
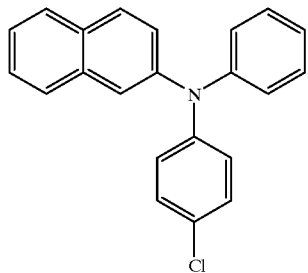
B-13
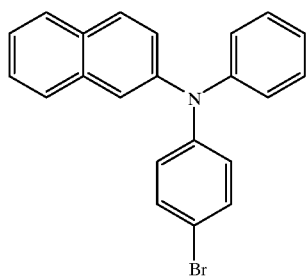
-continued
B-14
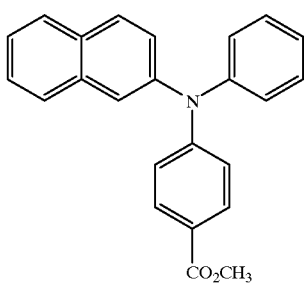
B-15
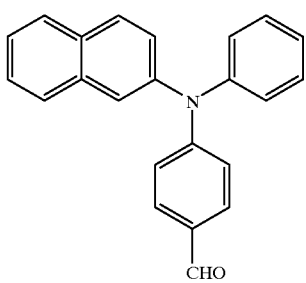
B-16
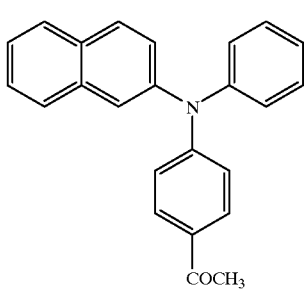
B-17
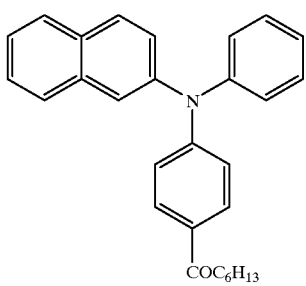
B-18
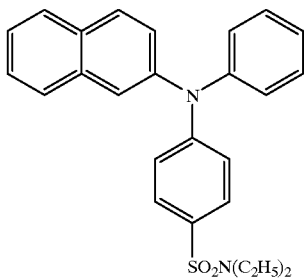

B-19
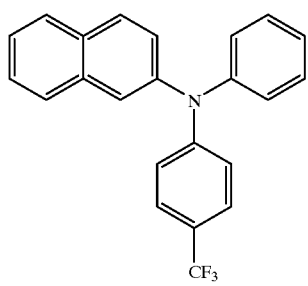
B-20
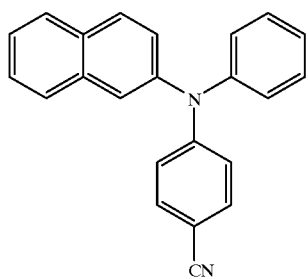
B-21
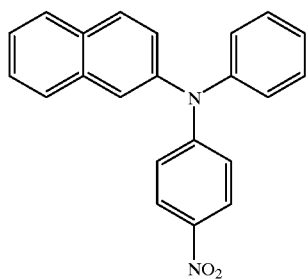
B-22
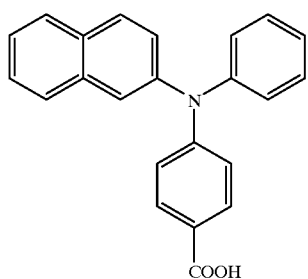
B-23
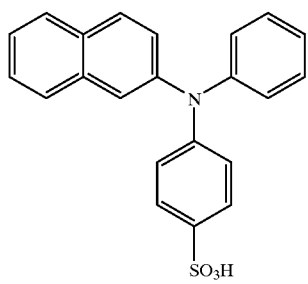
B-24
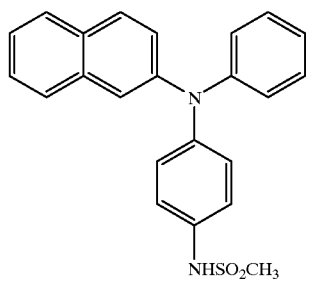
B-25
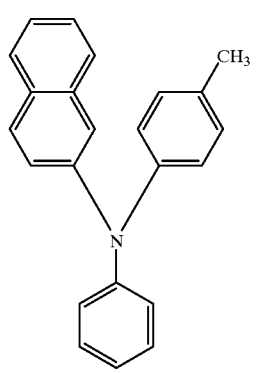
C-1
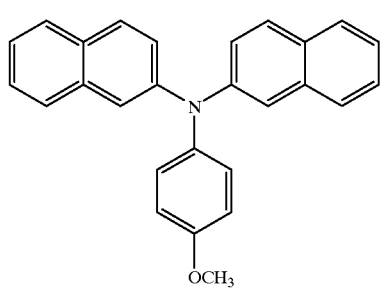
C-2
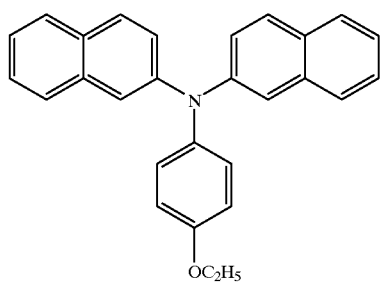
C-3
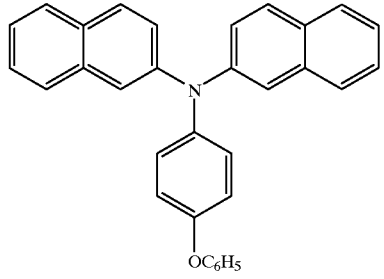

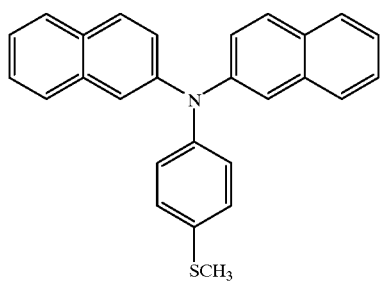 C-4
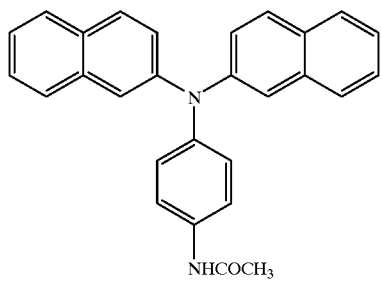 C-5
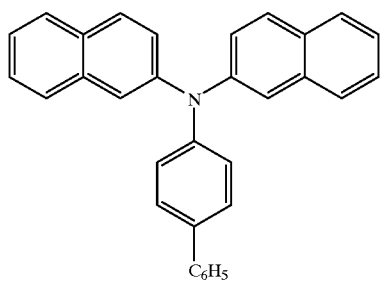 C-6
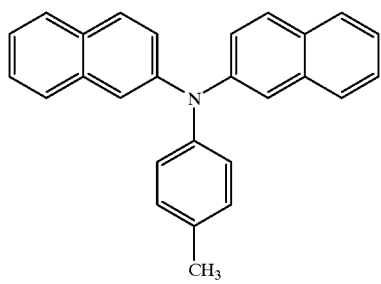 C-7
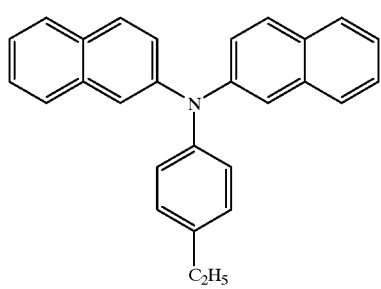 C-8
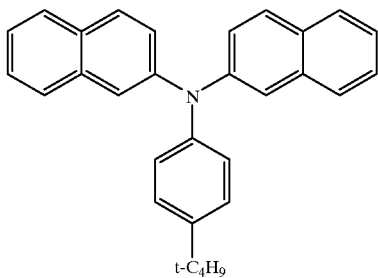 C-9
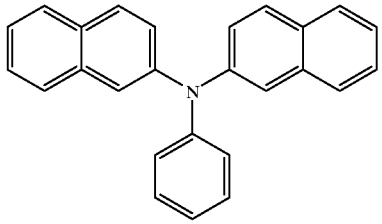 C-10
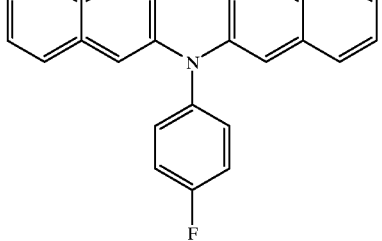 C-11
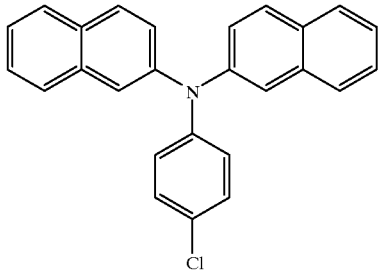 C-12
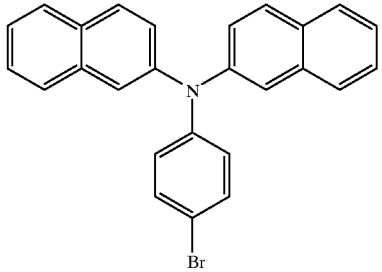 C-13

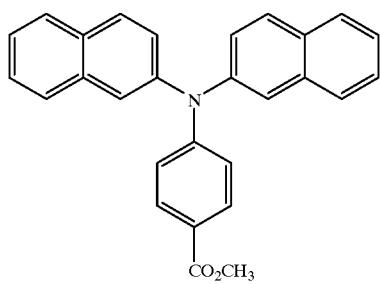 C-14
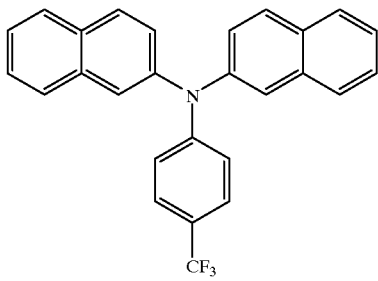 C-19
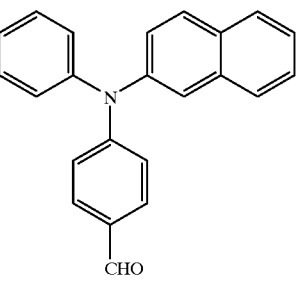 C-15
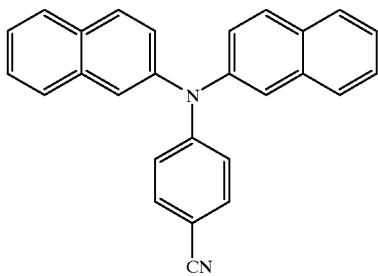 C-20
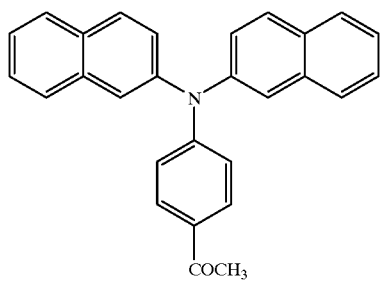 C-16
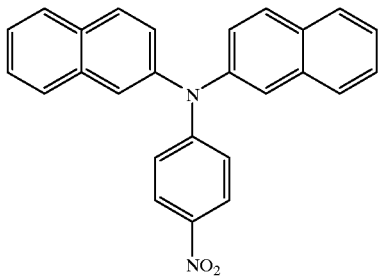 C-21
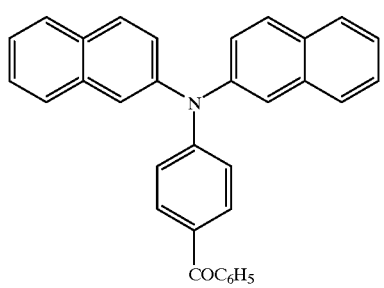 C-17
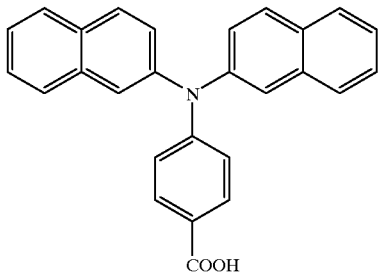 C-22
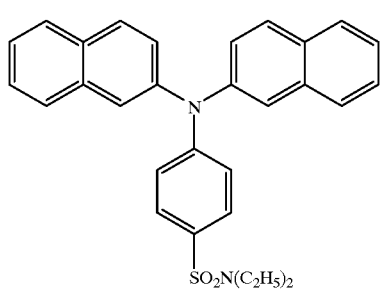 C-18
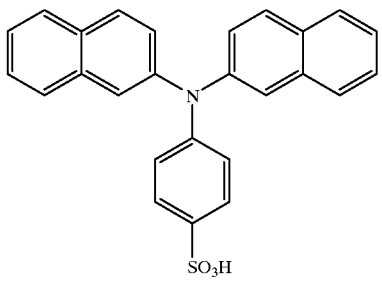 C-23

C-24
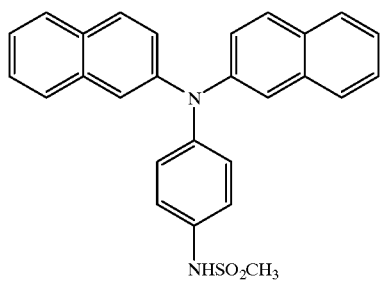
C-25
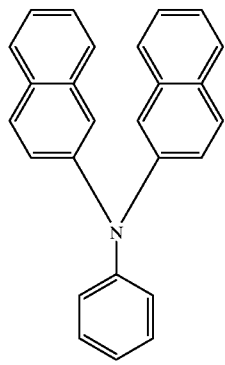
D-1
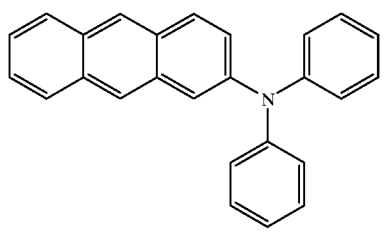
D-2
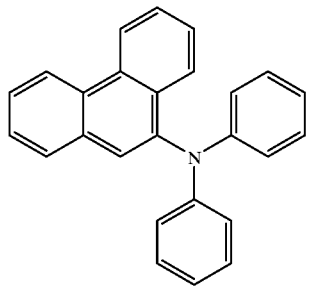
D-3
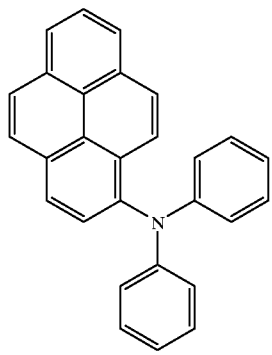
D-4
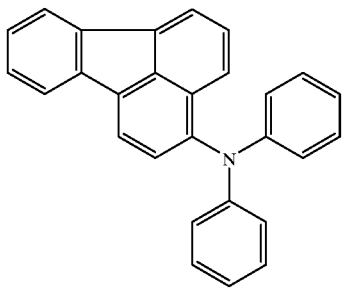
D-5
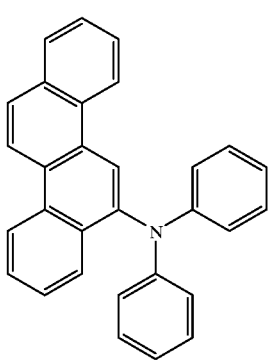
D-6
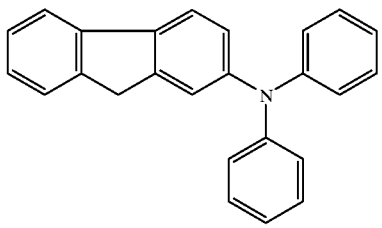
D-7
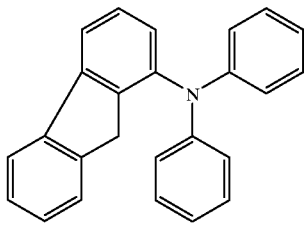
D-8
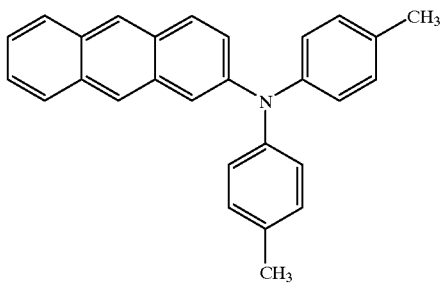

-continued

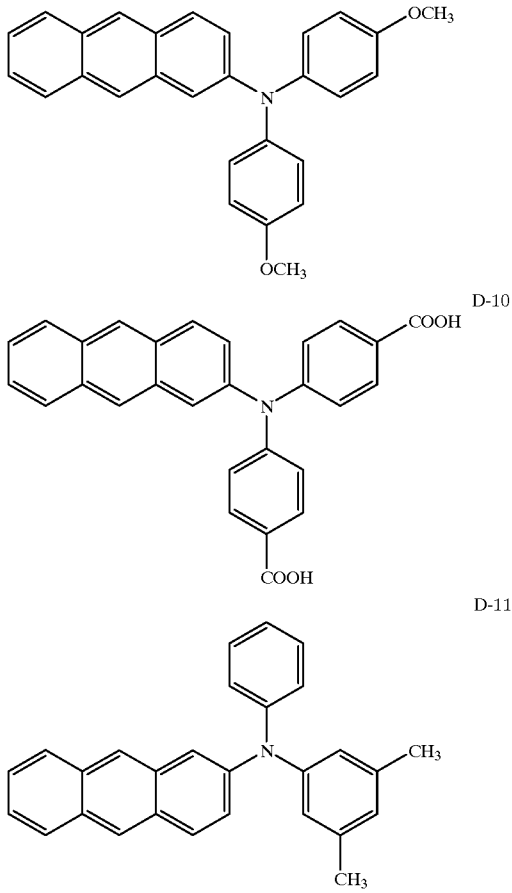

Other materials and processes employable for the manufacture of the non-aqueous lithium ion secondary battery of the invention are described below.

Each of the positive electrode and negative electrode can be prepared by coating a positive electrode material and a negative electrode material, respectively, on a electric collector. The electrode material comprise a positive electrode active material or a negative electrode material and may further contain an electroconductive material, a binder, a dispersant, a filler, an ion conductive agent, a pressurizing agent, and other various additives.

The negative material preferably is in essentially amorphous form when it is placed in the container (i.e., case) of the battery. The term of "amorphous" used in the specification means a condition which gives a broad scattered band having its main peak in the range of 20° to 40° (in terms of 2θ) in X-ray diffraction using Cu-K α rays. In the scattered band, a diffraction line may be present. The diffraction line in the range of 40° to 70° (in term of 2θ) preferably has a strength as much as 500 times or less (more preferably as much as 100 times or less, and moreover as much as 5 times or less) than the diffraction line in the range of 20° to 40° (in term of 2θ). Most preferably, there appears no diffraction lines representing a crystalline structure.

In the non-aqueous lithium ion secondary battery of the invention, the negative electrode preferably comprises a compound having the formula (1):

$$M^1 M^2_p M^4_q M^6_r \qquad (1)$$

in which $M^1$ and $M^2$ are different from each other and each represents at least one atom selected from the group consisting of Si, Ge, Sn, Pb, P, B, Al, and Sb (preferably, Si, Ge, Sn, P, B, or Al; more preferably, Si, Sn, P, B, or Al); $M^4$ represents at least one atom selected from the group consisting of Li, Na, K, Rb, Cs, Mg, Ca, Sr, and Ba (preferably, K, Cs, Mg, or Ca; more preferably, Cs or Mg); $M^6$ represents at least one atom selected from the group consisting of O, S, and Te (preferably O or S; most preferably, O); each of p and q is a number of 0.001 to 10 (preferably, 0.01 to 5; more preferably, 0.01 to 2); and r is a number of 1.00 to 50 (preferably 1.00 to 26; more preferably 1.02 to 6).

There are no specific limitation with respect to valency of $M^1$ and $M^2$. Each may be composed of a metal having a single valence or a mixture of metals having plural valences. The ratio of $M^2$ and $M^4$ to $M^1$ can be continuously varied within 0.001 to 10 molar equivalents per one molar equivalent of $M^1$. The amount of $M^6$ (that is represented by the value of "r" in the formula (1)) continuously varies according to the variation of the amount of $M^2$ and $M^4$.

The "$M^1$", of the above-mentioned formula (1) preferably is Sn, particularly divalent Sn. Therefore, the compound of the following formula (2) is more preferred.

$$SnM^3_p M^5_q M^7_r \qquad (2)$$

in which $M^3$ represents at least one atom selected from the group consisting of Si, Ge, Pb, P, B, and Al (preferably, Si, Ge, P, B, or Al; more preferably, Si, P, B, or Al); $M^5$ represents at least one atom selected from the group consisting of Li, Na, K, Rb, Cs, Mg, Ca, Sr, and Ba (preferably, Cs or Mg; most preferably, Mg); $M^7$ represents at least one atom selected from the group consisting of O or S (preferably O); each of p and q is a number of 0.001 to 10 (preferably, 0.01 to 5; more preferably, 0.01 to 1.5; most preferably, 0.7 to 1.5); and r is a number of 1.00 to 50 (preferably 1.00 to 26; more preferably 1.02 to 6).

The negative electrode material of the formula (1), particularly, of the formula (2) imparts to the resulting non-aqueous lithium ion secondary battery improved charge-discharge cycle characteristics, high discharge voltage, large capacity, improved safety, and improved large electric current performance.

Examples of the preferred negative electrode material include the following:
$SnAl_{0.4}B_{0.5}P_{0.5}K_{0.1}O_{3.65}$, $SnAl_{0.4}B_{0.5}P_{0.5}Na_{0.2}O_{3.7}$,
$SnAl_{0.4}B_{0.3}P_{0.5}Rb_{0.2}O_{3.4}$, $SnAl_{0.4}$, $B_{0.5}P_{0.5}Cs_{0.1}O_{3.65}$,
$SnAl_{0.4}B_{0.5}P_{0.5}K_{0.1}Ge_{0.05}O_{3.85}$,
$SnAl_{0.4}B_{0.5}P_{0.5}K_{0.1}Mg_{0.1}Ge_{0.02}O_{3.83}$, $SnAl_{0.4}B_{0.4}P_{0.4}O_{3.2}$,
$SnAl_{0.3}B_{0.5}P_{0.2}O_{2.7}$, $SnAl_{0.3}B_{0.5}P_{0.2}O_{2.7}$,
$SnAl_{0.4}B_{0.5}P_{0.3}Ba_{0.08}Mg_{0.08}O_{3.26}$,
$SnAl_{0.4}B_{0.4}P_{0.4}Ba_{0.08}O_{3.28}$, $SnAl_{0.4}B_{0.5}P_{0.5}O_{3.6}$,
$SnAl_{0.4}B_{0.5}P_{0.5}Mg_{0.1}O_{3.7}$, $SnAl_{0.5}B_{0.4}P_{0.5}Mg_{0.1}F_{0.2}O_{3.65}$,
$SnB_{0.5}P_{0.5}Li_{0.1}Mg_{0.1}F_{0.2}O_{3.05}$,
$SnB_{0.5}P_{0.5}K_{0.1}Mg_{0.1}F_{0.2}O_{3.05}$,
$SnB_{0.5}P_{0.5}K_{0.05}Mg_{0.05}F_{0.1}O_{3.03}$,
$SnB_{0.5}P_{0.5}K_{0.05}Mg_{0.1}F_{0.2}O_{3.03}$,
$SnAl_{0.4}B_{0.5}P_{0.5}Cs_{0.1}Mg_{0.1}F_{0.2}O_{3.65}$,
$SnB_{0.5}P_{0.5}Cs_{0.05}Mg_{0.05}F_{0.1}O_{3.03}$, $SnB_{0.5}P_{0.5}Mg_{0.1}F_{0.1}O_{3.05}$,
$SnB_{0.5}P_{0.5}Mg_{0.1}F_{0.2}O_3$, $SnB_{0.5}P_{0.5}Mg_{0.1}F_{0.06}O_{3.7}$,
$SnB_{0.5}P_{0.5}Mg_{0.1}F_{0.14}O_{3.03}$, $SnPBa_{0.08}O_{3.58}$, $SnPK_{0.1}O_{3.55}$,
$SnPK_{0.05}Mg_{0.05}O_{3.58}$, $SnPCs_{0.1}O_{3.55}$, $SnPBa_{0.08}F_{0.08}O_{3.54}$,
$SnPK_{0.1}Mg_{0.1}F_{0.2}O_{3.55}$, $SnPK_{0.05}Mg_{0.05}F_{0.1}O_{3.53}$,
$SnPCs_{0.1}Mg_{0.1}F_{0.2}O_{3.55}$, $SnPCs_{0.05}Mg_{0.05}F_{0.1}O_{3.53}$,
$Sn_{1.1}Al_{0.4}B_{0.2}P_{0.6}Ba_{0.08}F_{0.08}O_{3.54}$,
$Sn_{1.1}Al_{0.4}B_{0.2}P_{0.6}Li_{0.1}K_{0.1}Ba_{0.1}F_{0.1}O_{3.65}$,
$Sn_{1.1}Al_{0.4}B_{0.4}P_{0.4}Ba_{0.08}O_{3.34}$, $Sn_{1.1}Al_{0.4}PCs_{0.05}O_{4.23}$,
$Sn_{1.1}Al_{0.4}PK_{0.05}O_{4.23}$, $Sn_{1.2}Al_{0.5}B_{0.3}P_{0.4}Cs_{0.2}O_{3.5}$,
$Sn_{1.2}Al_{0.4}B_{0.2}P_{0.6}Ba_{0.08}O_{3.68}$,
$Sn_{1.2}Al_{0.4}B_{0.2}P_{0.6}Ba_{0.08}F_{0.08}O_{3.64}$, $Sn_{1.2}Al_{0.4}B_{0.2}P_{0.6}Mg_{0.04}Ba_{0.04}O_{3.68}$,
$Sn_{1.2}Al_{0.4}B_{0.3}P_{0.5}Ba_{0.08}O_{3.58}$, $Sn_{1.3}Al_{0.3}B_{0.3}P_{0.4}Na_{0.2}O_{3.3}$,
$Sn_{1.3}Al_{0.2}B_{0.4}P_{0.4}Ca_{0.2}O_{3.4}$, $Sn_{1.3}Al_{0.4}B_{0.4}P_{0.4}Ba_{0.2}O_{3.6}$,
$Sn_{1.4}Al_{0.4}PK_{0.2}O_{4.6}$, $Sn_{1.4}Al_{0.2}Ba_{0.1}PK_{0.2}O_{4.45}$,
$Sn_{1.4}Al_{0.2}Ba_{0.2}PK_{0.2}O_{4.6}$,
$Sn_{1.4}Al_{0.4}Ba_{0.2}PK_{0.2}Ba_{0.1}F_{0.2}O_{4.9}$, $Sn_{1.4}Al_{0.4}PK_{0.3}O_{4.65}$,
$Sn_{1.5}Al_{0.2}PK_{0.2}O_{4.4}$, $Sn_{1.5}Al_{0.4}PK_{0.1}O_{4.65}$,
$Sn_{1.5}Al_{0.4}PCs_{0.05}O_{4.63}$, $Sn_{1.5}Al_{0.4}PCs_{0.05}Mg_{0.1}F_{0.2}O_{4.63}$,
$SnSi_{0.5}Al_{0.1}B_{0.2}P_{0.1}Ca_{0.4}O_{3.1}$, $SnSi_{0.4}Al_{0.2}B_{0.4}O_{2.7}$,
$SnSi_{0.5}Al_{0.2}B_{01}P_{0.1}Mg_{0.1}O_{2.8}$, $SnSi_{0.6}Al_{0.2}B_{0.2}O_{2.8}$,
$SnSi_{0.5}Al_{0.3}B_{0.4}P_{0.2}O_{3.55}$, $SnSi_{0.5}Al_{0.3}B_{0.4}P_{0.5}O_{4.30}$,
$SnSi_{0.6}Al_{0.1}B_{0.1}P_{0.3}O_{3.25}$, $SnSi_{0.6}Al_{0.1}B_{0.1}P_{0.1}Ba_{0.2}O_{2.95}$,
$SnSi_{0.6}Al_{0.1}B_{0.1}P_{0.1}Ca_{0.2}O_{2.95}$, $SnSi_{0.6}Al_{0.4}B_{0.2}Mg_{0.1}O_{3.2}$,
$SnSi_{0.6}Al_{0.1}B_{0.3}P_{0.1}O_{3.05}$, $SnSi_{0.6}Al_{0.2}Mg_{0.2}O_{2.7}$,
$SnSi_{0.6}Al_{0.2}Ca_{0.2}O_{2.7}$, $SnSi_{0.6}Al_{0.2}P_{0.2}O_{3}$,
$SnSi_{0.6}B_{0.2}P_{0.2}O_{0.2}O_{3}$, $SnSi_{0.8}Al_{0.2}O_{2.9}$,
$SnSi_{0.8}Al_{0.3}B_{0.2}B_{0.2}P_{0.2}O_{3.85}$, $SnSi_{0.8}B_{0.2}O_{2.9}$,
$SnSi_{0.8}Ba_{0.2}O_{2.8}$, $SnSi_{0.8}Mg_{0.2}O_{2.8}$, $SnSi_{0.8}Ca_{0.2}O_{2.8}$,
$SnSi_{0.8}P_{0.2}O_{3.1}$, $Sn_{0.9}Mn_{0.3}B_{0.4}P_{0.4}Ca_{0.1}Rb_{0.1}O_{2.95}$,
$Sn_{0.9}Fe_{0.3}B_{0.4}P_{0.4}Ca_{0.1}Rb_{0.1}O_{2.95}$, $Sn_{0.8}Pb_{0.2}Ca_{0.1}P_{0.9}O_{3.35}$,
$Sn_{0.3}Ge_{0.7}Ba_{0.1}P_{0.9}O_{3.35}$, $Sn_{0.9}Mn_{0.1}Mg_{0.1}P_{0.9}O_{3.35}$,
$Sn_{0.2}Mn_{0.8}Mg_{0.1}P_{0.9}O_{3.35}$, $Sn_{0.7}Pb_{0.3}Ca_{0.1}P_{0.9}O_{3.35}$,
$Sn_{0.2}Ge_{0.8}Ba_{0.1}P_{0.9}O_{3.35}$.

The above-mentioned complex oxide compound can be produced by firing materials containing the elements to be incorporated into the finally produced compound. The compound can be produced by a solution method. The firing method is generally employed. Therefore, the process for the production of the complex oxide compound is hereinbelow described for the firing process.

An $M^1$-containing compound, an $M^2$-containing compound, an $M^4$-containing compound and, if required, an $M^6$-containing compound are mixed and fired.

Examples of Sn-containing compounds include SnO, $SnO_2$, $Sn_2O_3$, $Sn_3O_4$, $Sn_7O_{13} \cdot H_2O$, $Sn_8O_{15}$, stannous hydroxide, stannic oxyhydroxide, stannite, stannous oxalate, stannous phosphate, orthostannic acid, methastannic acid, parastannic acid, stannous fluoride, stannic fluoride, stannous chloride, stannic chloride, stannous pyrophosphate, stannic phosphide, stannous sulfide, and stannic sulfide.

Examples of Si-containing compounds include $SiO_2$, SiO, organic silicone compounds such as tetramethylsilane and tetraethylsilane, alkoxy silane compounds such as tetramethoxysilane and tetraethoxysilane, and hydrosilanes such as trichlorohydrosilane.

Examples of Ge-containing compounds include $GeO_2$, GeO, and alkoxy-germanium compounds such as germanium tetramethoxide and germanium tetraethoxide.

Examples of Pb-containing compounds include $PbO_2$, PbO, $Pb_2O_3$, $Pb_3O_4$, lead nitrate, lead carbonate, lead formate, lead acetate, lead tetraacetate, lead tartarate, lead diethoxide and lead di(isopropoxide).

Examples of P-containing compounds include phosphorus pentoxide, phosphorus oxychloride, phosphorus pentachloride, phosphorus trichloride, phosphorus tribromide, trimethylphosphoric acid, triethylphosphoric acid, tripropylphosphoric acid, stannous pyrophosphite, and boron phosphate.

Examples of B-containing compounds include boron oxide ($B_2O_3$), boron chloride, boron bromide, boron carbide, boric acid, trimethyl borate, triethyl borate, tripropyl borate, tributyl borate, boron phosphide, and boron phosphate.

Examples of Al-containing compounds include aluminum oxides (α-alumina and β-alumina), aluminum silicate, aluminum tri-isopropoxide, aluminum tellurite, aluminum chloride, aluminum boride, aluminum phosphide, aluminum phosphate, aluminum lactate, aluminum borate, aluminum sulfide, and aluminum sulfate.

Examples of Sb-containing compounds include antimony oxide ($Sb_2O_3$) and triphenylantimony.

Examples of Mg-containing compounds, Ca-containing compounds, Sr-containing compounds and Ba-containing compounds include oxides, hydroxides, carbonates, phosphates, sulfates, nitrates, and aluminum complexes of the respective metals.

The negative electrode material can further contain other elements such as transition metal elements (e.g., Sc, Ti, V, Cr, Mn, Fe, Co, Ni, Cu, Zn, Y, Zr, Nb, Mo, Tc, Ru, Rh, Pd, Ag, Cd), lanthanide metal elements (e.g., Hf, T. W, Re, Os, Ir, Pt, Au, Hg), elements of 17 Group of Periodic Table (e.g., F, Cl). The negative electrode material may contain a dopant (e.g., Sb-containing compound, In-containing compound, Nb-containing compound) for increasing the electron-conductivity. These metals and compounds can be incorporated into the negative electrode compound in an amount of not more than 20 molar %.

The firing is preferably performed at a temperature increase rate of 4 to 2,000° C. per minute, more preferably 6 to 2,000° C., most preferably 10 to 2,000° C. The firing temperature preferably is in the range of 250 to 1,5000° C., more preferably 350 to 1,500° C., most preferably 500 to 1,500° C. The firing period preferably is in the range of 0.001 to 100 hours, more preferably 0.5 to 70 hours, most preferably 1 to 20 hours. The temperature decrease rate preferably is 2 to 107° C. per minute, more preferably 4 to 107° C., particularly preferably 6 to 107° C., and most preferably 10 to 107° C.

The temperature increase rate described in the specification means a mean temperature increase rate in the range from the temperature of 50% of the firing temperature (in terms of °C.) to the temperature of 80% of the firing temperature. The temperature decrease rate described in the specification means a mean temperature decrease rate in the range from the temperature of 80% of the firing temperature (in terms of °C.) to the temperature of 50% of the firing temperature.

The temperature decrease can be performed by keeping the fired product in a firing furnace. Alternatively, the fired product can be taken out of the furnace and placed in water. Otherwise, ultra-rapid cooling methods such as Gun method, Hammer-Anvil method, Slap method, Gas atomizing method, Plasma spray method, Centrifugal rapid-cooling method, and Melt drag method (which are described on page 217 of "Ceramics Processing": Gihodo Publishing, 1987) can be employed. Also employed are a single roller method and a double roller method (which are described on page 172 of "New Glass Handbook": Maruzen, 1991). In the case that the fired product melts in the firing process, the molten product can be continuously taken out of the furnace, while the starting materials are continuously supplied. The molten product is preferably stirred in the firing process.

The firing process is preferably performed in an inert gaseous atmosphere (oxygen content: not more than 5 volume %), more preferably in an inert gas atmosphere containing no oxygen. Examples of the inert gases include nitrogen, argon, helium, krypton and xenon.

The chemical formula of the fired negative electrode material can be determined by the known inductive combination plasma (ICP) emission spectroanalysis. Otherwise, the formula can be simply determined by reducing the weight of the fired product from the weights of the starting materials.

The valency of Sn can be determined by chemical titration, such as the method described in Physics and Chemistry of Glasses, Vol.8, No.4 (1967), page 165. The valency also can be determined from a Knight shift observed by Solid Nuclear Magnetic Resonance ($^{119}$Sn—NMR) Spectroscopy for Sn. For instance, metallic Sn (Sn of 0 valence) gives a peak at a magnetic field of at approx. 7,000 ppm which is extremely lower than that of Sn(CH$_3$)$_4$ in a broad measurement. In contrast, SnO (valence: 2) shows its peak around 100 ppm, and Sno$_2$ (valence: 4) shows its peak around −600 ppm. Thus, the knight shift greatly depends on the valency of Sn (i.e., central metal) under the condition in that the same ligand is attached. Therefore, the position of the peak observed in $^{119}$Sn—NMR spectroscopy can be used for determination of valency of tin.

The negative electrode material of the aforementioned formula (1), particularly the formula (2) can be preferably employed in a powder having a mean particle size of 0.1 to 60 μm, more preferably of 1.0 to 30 μm, most preferably 2.0 to 20 μm. The powdery negative electrode material can be pulverized and/or classified to give the desired mean particle size. A known pulverizing apparatus or classifier such as mortar, ball mill, sand mill, vibrating ball mill, planet ball mill, circulating stream jet mill, or sieve can be employed. If desired, the wet pulverization can be carried out in the presence of water or an organic solvent such as methanol. The pulverized product is preferably classified to give the desired mean particle size. The classification can be carried out by any methods under dry or wet conditions, for instance, using sieve, air classifier, and water classifier.

Into the negative electrode material, lithium ions can be intercalated before or after the electrode material is incorporated into the battery case. The lithium ions can be intercalated in such an amount as to give a potential substantially corresponding to the deposition potential of lithium. For instance, the lithium ions can be intercalated in an amount of 50 to 700 molar %, preferably 100 to 600 molar %, based on the amount of the negative electrode material. The amount of releasable lithium ions preferably corresponds to the amount of intercalated lithium ions. The intercalation of lithium ions can be performed by electro-chemical method, chemical method or thermal method. The electrochemical method and chemical method are preferred. In the electrochemical method, a method in which lithium ions contained in the positive electrode active material are electrochemically released and intercalated into the negative electrode material, and a method in which lithium ions are electro-chemically released from lithium metal or lithium metal alloy and intercalated into the negative electrode material are both preferred. In the chemical method, the negative electrode material can be mixed or brought into contact with lithium metal or reacted with an organic lithium compound such as butyl lithium.

The positive electrode active material preferably comprises a lithium-containing transition metal oxide. The lithium-containing transition metal oxide is preferably prepared by mixing a lithium-containing compound and a transition metal-containing compound in which transition metal can be Ti, V, Cr, Mn, Fe, Co, Ni, Mo, or W, in a molar ratio of 0.3/1 to 2.2/1 and firing the mixed compounds.

The lithium-containing transition metal oxide is preferably represented by the formula of Li$_x$QO$_y$ in which at least a portion of Q is a transition metal such as Co, M, Ni, V, or Fe; x is a number of 0.2 to 1.2; and y is a number of 1.4 to 3. The remaining portion of Q can be Al, Ga, In, Ge, Sn, Pb, Sb, Bi, Si, P, or B. These additive metal can be incorporated in an amount of not more than 30 molar %.

Examples of the more preferred lithium-containing transition metal oxide (for the positive electrode active material) include Li$_x$CoO$_2$, Li$_x$NiO$_2$, Li$_x$MnO$_2$, Li$_x$Co$_a$Ni$_{1-a}$O$_2$, Li$_x$Co$_b$V$_{1-b}$O$_x$, Li$_x$Co$_b$Fe$_{1-b}$O$_2$, Li$_x$Mn$_2$O$_4$, and Li$_x$Mn$_c$Co$_{2-c}$O$_4$, in which x is a number of 0.7 to 1.2, "a" is a number of 0.1 to 0.9, b is a number of 0.8 to 0.98, c is a number of 1.6 to 1.96, and z is a number of 2.01 to 2.3. Examples of the most preferred lithium-containing transition metal oxide include Li$_x$CoO$_2$, Li$_x$NiO$_2$, Li$_x$MnO$_2$, Li$_x$Co$_a$Ni$_{1-a}$O$_2$, Li$_x$Mn$_2$O$_4$, and Li$_x$Co$_b$V$_{1-b}$O$_x$, in which x is a number of 0.7 to 1.2, "a" is a number of 0.1 to 0.9, b is a number of 0.8 to 0.98, and z is a number of 2.01 to 2.3. In the formulas, the number of x means the number before the charging procedure begins. The number of x varies in the charge-discharge cycle.

Examples of the electroconductive materials are those which are chemically stable in the battery and include naturally produced graphites such as flake graphite, massive graphite, synthetic graphite, carbon black, acetylene black, ketchen black, carbonaceous fibers, powder of metal or metal compounds (e.g., copper, nickel, aluminum, silver, zinc oxide, titanium oxide, and potassium titanate), metal or metal compound fibers (i.e., electroconductive whisker), and polyphenylene derivatives. These materials can be employed singly or in combination. Particularly preferred are graphite and carbon black. The amount of the electro-conductive material incorporated into the electrode material generally is in the range of 6 to 50 wt. %, preferably 1 to 30 wt. %. When carbon or graphite is employed, its amount preferably is in the range of 6 to 20 wt. %.

Examples of the binders include polysacaharides, thermoplastic resins, and elastic polymers, such as starch, carboxymethyl cellulose, cellulose, diacetyl cellulose, methylcellulose, hydroxyethylcellulose, hydroxypropylcellulose, sodium alginate, polyacrylic acid, sodium polyacrylate, polyvinylphenol, polyvinylmethyl ether, polyvinyl alcohol, polyvinyl pyrrolidone, polyacrylamide, polyhydroxy(meth)acrylate, styrene-maleic acid copolymer, and other water-soluble polymers, polyvinyl chloride, polytetrafluoroethylene, polyfluorinated vinylidene, tetrafluoroethylene-hexafluoropropylene co-polymer, vinylidene fluoride-tetrafluoroethylene-hexa-flouropropylene copolymer, polyethylene, polypropylene, ethylene-propylene-diene terpolymer (EPDM), sulfonated EPDM, polyvinyl acetal resin, methyl (meth)acrylate, 2-ethylhexyl acrylate, and other (meth)acrylate copolymers, (meth)acrylate-acrylonitrile copolymer, polyvinyl ester copolymers containing a recurring unit derived from a vinyl ester such as vinyl acetate, styrene-butadiene rubber, polybutadiene, neoprene rubber, fluorinated rubber, polyethylene oxide, polyester-polyurethane resin, polyether-polyurethane resin, polycarbonate-polyurethane resin, polyester resin, phenol resin, epoxy resin, and other polymers in the form of emulsion (latex) and suspension. Preferred are a latex of polyacrylic acid ester, carboxymethyl cellulose, polytetrafluoroethylene, and polyfluorinated vinylidene. These materials can be employed singly or in combination. The amount of the binder preferably is in the range of 1 to 30 wt. %, more preferably of 2 to 10 wt. %.

Each of the mixture of the negative electrode material and the mixture of the positive electrode material is preferably prepared in an aqueous solution to give a mixture paste. The mixture paste can be prepared by the steps of: mixing the electrode material with the electro-conductive material; adding a binder (in the form of suspension or emulsion (latex) of the resin powder) and water to the resulting mixture; kneading the resulting aqueous mixture; dispersing the kneaded mixture in a mixing or dispersing apparatus such as mixer, homogenizer, desolver, planetary mixer, paint shaker or sand mill.

Thus prepared electrode mixture paste can be coated on a collector, dried and pressed to give the electrode sheet. The coating can be performed by various methods, such as, reverse roll method, direct roll method, blade method, knife method, extrusion method, curtain method, gravure method, bar method, dip method or squeeze method. The blade method, knife method and extrusion method are preferably employed. The coating is preferably performed at a rate of 0.1 to 100 m/min. The coating method can be appropriately selected in consideration of the liquid property and drying easiness of the mixture paste, to give satisfactory surface conditions to the coated layer. The thickness, length and width of the coated layer can be determined depending on the dimensions of electric battery. The coated layer preferably has a thickness in the range of 1 to 2,000 $\mu$m after the coated layer is dried and pressed.

The drying procedure (or dehydrating procedure) can be performed in the conventional ppmamppner. Hot air, vacuum, infrared rays, far infrared rays, electron beams and dry air are employable singly or in combination. The drying procedure is preferably carried out at a temperature of 80 to 350° C., more preferably 100 to 250° C.

The water content in the whole materials preferably is not more than 2,000 ppm. Each of the positive and negative electrode materials has a water content of not more than 500 ppm, so that the satisfactory charge-discharge cycle performance can be attained.

The pressing procedure for the preparation of the electrode sheet can be performed by the conventional pressing method, particularly the metal mold press method or the calender press method. The pressure is not limitative, but generally the pressure is in the range of 10 kg/cm$^2$ to 3 t/cm$^2$. The pressing procedure can be preferably carried out at a rate of 0.1 to 50 m/sec., and at a temperature of room temperature to 200° C.

The collector comprises an electro-conductive material which is chemically stable in the battery. Examples of the collectors for positive electrode include sheets of stainless steel, nickel, aluminum, titanium, fired carbon, and sheet of aluminppuppm or stainless steel which is plated with carbon, nickel, titanium or silver. An aluminum foil is preferred for the positive electrode. Examples of the collectors for negative electrode include sheets of stainless steel, nickel, copper, titanium, aluminum, fired carbon, sheet of copper or stainless steel which is plated with carbon, nickel, titanium or silver, and Al-Cd alloy. A copper foil is preferred for the negative electrode. The collectors can be oxidized on their surfaces. The collectors can be made in various forms such as sheet, foil, film, net, punched sheet, porous body and sheet and combined fibers (fibrous mass). The thickness of the collector generally is in the range of 5 to 100 $\mu$m.

The separator is an electro-insulating thin film having a high ionic permeation rate and an appropriate physical strength. For instance, a non-woven sheet, a woven sheet, or a porous film made of an olefinic polymer such as polypropylene or polyethylene, fluorinated polymer, cellulose polymer, polyimide, polyamide, glass fiber, or an alumina fiber can be employed. As the material, polypropylene, polyethylene, mixture of polypropylene and polyethylene, mixture of polypropylene and polytetrafluoroethylene, and mixture of polyethylene and polytetrafluoroethylene are preferably employed. As the form, the porous film is preferred. The pore sizes of the separator preferably is in the range of 0.01 to 1 $\mu$m. The thickness of the separator generally is in the range of 5 to 50 $\mu$m.

For the manufacture of the non-aqueous lithium ion secondary battery, the positive electrode sheet and the negative electrode sheet are overlaid via a separator and spirally coiled up. The coiled electrode sheets are then encased in a container of battery. The coiled electrode sheets are electrically connected to the container, and the electrolyte solution is placed in the container. The container is then sealed, for instance, using a plate having safety valve. In order to assure the safety of battery more reliably, that is, to prevent production of over current, a fuse element, a bimetal element, or a PCT element can be used. Independently on or in addition to the provision of safety valve, provision of shallow cut to the battery container, gasket, and/or seal plate can be made so as to assure the safety. The charging apparatus can be equipped with a circuit to prevent the over charging or over discharging.

The battery container can be manufactured using a nickel-plated iron steel plate, a stainless steel plate (e.g., SUS 304, SUS 304L, SUS 304N, SUS 316, SUS 316L, SUS 430, and SUS 444), a nickel-plated stainless steel plate based on the above-listed stainless steel plate, sheets of aluminum or aluminum alloy, nickel sheet, titanium sheet, or copper sheet. The container can be in the form of cylinder having a section of true circle, ellipse, oval, square, or rectangular. If the container serves as the negative electrode terminal, the container is preferably made of stainless steel sheet, or sheet of aluminum or aluminum alloy.

The electrolyte solution can be introduced into the container in one time. However, the electrolyte solution is preferably introduced into the container in two or more times. If the electrolyte solution is incorporated in plural times, each portion can be the same as or different from each other. For instance, a non-aqueous solvent only or a solution of a lithium salt in a non-aqueous solvent can be first introduced into the container, and then a non-aqueous solvent having increased viscosity or a more viscous solution of a lithium salt in a non-aqueous solvent can be introduced. In order to shorten the period required for the introduction of the electrolyte solution into the container, the inside of the container can be made vacuum (preferably 500 to 1 torr, more preferably 400 to 10 torr). The container can be subjected to centrifugal action or ultrasonic treatment.

The container and lead plate can be made of electro-conductive metal or its metal alloy. For instance, iron, nickel, titanium, chromium, molybdenum, copper, or aluminum or an alloy thereof can be employed. The cap, container, sheets, and lead plates can be welded to each other by the conventional welding method, such as direct current electric welding, alternating current electric welding, laser welding, or ultrasonic welding. As the sealing agent, the conventional agent such as asphalt or its mixture can be employed.

The gasket can be made of olefinic polymers, fluorinated polymers, cellulosic polymers, polyimide, or polyamide. From the viewpoints of resistance to organic solvents and low water permeability, olefinic polymers, particularly propylene type copolymers, more specifically a propylene-ethylene block copolymer, are preferably employed.

The non-aqueous lithium ion secondary battery of the invention can be covered on its outer surface. The coverage can be made using heat shrinkable tube, adhesive tape, metal film, paper sheet, fabric sheet, paint, or plastic casing. The outer surface of the battery can be colored with heat-sensitive coloring material, at least on its local area, to keep the record of thermal history in its use.

If desired, a plural number of the secondary batteries can be arranged in series or in parallel and encased in a battery package. The packed battery can be equipped with a positive temperature coefficient resistance element, a temperature fuse, a safety element such as a fuse or an electric current breaker, and a safety circuit (i.e., circuit for monitoring the voltage, temperature and electric current in each battery and/or a set of batteries, and breaking the current down when it is required). The packed battery can have outer terminals serving as positive and negative electrode terminals for each battery, temperature sensor terminals for the battery set and each battery, and current-detecting terminals for the battery set, in addition to the positive and negative electrode terminals for the whole battery set. The packed battery can further contain a voltage converting circuit (e.g., DC-DC converter) therein. Each battery can be connected to each other with a welded lead plate or using a socket for easy detachment. The packed battery can furthermore has a display means for showing the remaining battery capacity, requirement of charging, the number of use, and the like.

The non-aqueous lithium ion secondary battery of the invention can be utilized in various products and devices. Examples are video movies, handy video decks equipped with monitor, movie cameras equipped with monitor, compact cameras, reflex cameras, lens-equipped films, handy computers, handy word processors, electric pocket notebooks, handy phones, cordless phones, electric shavers, electric-powered tools, electric-powered mixers, and motor cars.

The present invention is further described in the following non-limitative examples.

EXAMPLE 1

Preparation of Electrode Material Mixture Paste (1) Positive electrode material mixture paste 200 g of $LiCoO_2$ (i.e., positive electrode active material, prepared by placing a mixture of lithium carbonate and tricobalt tetraoxide in a molar ratio of 3 to 2 in an alumina crucible, calcining the mixture at 750° C. for 4 hours in the atmospheric condition after it was heated to 750° C. at a temperature elevation rate of 2° C./min., firing the calcined product at 900° C. for 8 hours after it was heated to 900° C. at a temperature elevation rate of 2° C./min., and pulverizing the fired product; central particle size: 5 $\mu$m; electro-conductivity and pH of the dispersion in which 50 g of the pulverized product was dispersed in 100 mL of water: 0.6 mS/m and 10.1; specific surface area measured by nitrogen adsorption method: 0.42 $m^2$/g) and 10 g of acetylene black were mixed in a homogenizer. To the mixture were successively added 8 g of an aqueous dispersion of copolymer of 2-ethylhexyl acrylate and acrylonitrile (binder, solid content: 50 weight %) and 60 g of an aqueous carboxymethyl cellulose solution (binder, concentration: 2 weight %). The resulting mixture was kneaded, and to the kneaded mixture was added 50 g of water. The resulting mixture was then stirred in a homogenizer to give the positive electrode material mixture paste.

(2) Negative electrode material mixture paste 200 g of $SnGe_{0.1}B_{0.5}P_{0.58}Mg_{0.1}K_{0.1}O_{3.35}$ (i.e., negative electrode material, prepared by mixing 6.7 g of tin monoxide, 10.3 g of tin pyrophosphate, 1.7 g of diboron trioxide, 0.7 g of potassium carbonate, 0.4 of magnesium oxide, and 1.0 g of germanium dioxide under dry conditions, placing the resulting mixture; firing the mixture at 1,100° C. for 12 hours in an argon atmosphere after it was heated to 1,000° C. at a temperature elevation rate of 15° C./min. in a firing furnace; decreasing the temperature of the fired product to room temperature at a rate of 10° C./min.; recovering the fired product from the furnace; and pulverizing the recovered product in a jet mill: mean particle size: 4.5 $\mu$m, X-ray diffraction spectroscopy using Cu-K $\alpha$ rays indicated that a broad peak was present at 28° in terms of 2$\theta$ value, and no diffraction peak to be assigned to crystalline structure was seen in the region of 40° to 70° in terms of 2$\theta$ value) and 30 g of an electro-conductive material (synthetic graphite) was mixed in a homogenizer. The resulting mixture was further mixed with 50 g of an aqueous carboxymethyl cellulose solution (binder, concentration: 2 weight %) and 10 g of polyfluorinated vinylidene (binder). The resulting mixture was then kneaded with 30 g of water, to give the negative electrode material mixture paste.

Preparation of Electrode Sheet (1) Positive electrode sheet

The positive electrode material mixture paste obtained above was coated on both surfaces of an aluminum foil collector (thickness: 30 $\mu$m) to give coated layers (coated amount: 400 g/$m^2$) by which the resulting electrode sheet provided with the coated layer on each surface had a total thickness of 280 $\mu$m after the pressing treatment. The coated layers were dried and pressed using a roller press, and the coated foil was cut to give a positive electrode sheet in a belt form of the predetermined dimensions. The obtained positive electrode sheet was placed in a dry box (atmosphere: dry air having a dew point of not higher than −50° C.) and heated by a far infrared heater to sufficiently dehydrate and dry the electrode sheet.

(2) Negative electrode sheet

The negative electrode material mixture paste obtained above was coated on both surfaces of a copper foil collector (thickness: 20 $\mu$m) and processed in the same manner as those employed for the preparation of the positive electrode sheet, to give a negative electrode sheet having a coated amount of 70 g/$m^2$ and a total thickness of 90 $\mu$m (after being pressed).

Preparation of Electrolyte Solution

In an argon atmosphere, 65.3 g of diethyl carbonate was placed in 200 cc-volume narrow necked polypropylene vessel. Into the diethyl carbonate was portionwise added and dissolved 22.2 g of ethylene carbonate, keeping the temperature lower than 30° C. In the solution were successively and portionwise dissolved 0.4 g of $LiBF_4$ and 12.1 g of $LiPF_6$, keeping the temperature lower than 30° C. The resulting electrolyte solution was a colorless clear solution having a specific gravity of 1.135. The water content was 18 ppm (measured by Karl Fischer Water Content Measuring Apparatus MKC-210, available from Kyoto Electronics Co., Ltd.), and free acid was 24 ppm (measured by neutralization titration using Bromothimol Blue (indicator) and 0.1 N aqueous NaOH solution).

In the electrolyte solution was dissolved the compound(s) set forth in Tables 1 to 7 to give the amine compound-containing electrolyte solution having the stated concentration.

Manufacture of Cylinder Battery

The positive electrode sheet, a micro-porous polypropylene film separator, the negative electrode sheet, and the same separator were overlaid in order and spirally coiled to give a coiled composite. The coiled composite was placed in a cylinder battery can having a bottom (made of nickel-plated iron, which was to serve as negative electrode terminal). Into the battery can was introduced the amine compound-containing electrolyte solution. On the battery can, a battery cover having a positive electrode terminal was placed and fixed to the can via a gasket, to give a cylinder battery.

Evaluation of Cylinder Battery

The cylinder battery was charged and discharged under the following conditions:

electric current density: 5 mA/cm$^2$;

charge-termination voltage: 4.1 V;

discharge-termination voltage: 2.8 V;

to determine the discharge capacity and cycle life.

In the following tables, the initial capacity is shown in terms of Wh, and the cycle life is shown in terms of a ratio of the capacity at the 300 cycles per the initial capacity. The amine compound is indicated by the compound number given in the specification hereinbefore.

TABLE 1

| Sample | Amine compound | Concentration (mol/L) | Initial capacity | Cycle life (%) |
|---|---|---|---|---|
| 101 | A-1 | 0.01 | 1.0 | 83 |
| 102 | A-3 | 0.01 | 0.98 | 82 |
| 103 | A-1 | 0.01 | 0.97 | 83 |
| 104 | A-3 | 0.01 | 0.98 | 82 |
| 105 | A-1 | 0.01 | 0.97 | 83 |
| 106 | A-3 | 0.001 | 1.0 | 81 |
| 107 | A-1 | 0.01 | 0.98 | 83 |
| 108 | A-3 | 0.05 | 0.97 | 82 |
| 109 | A-1 | 0.01 | 0.99 | 82 |
| 110 | A-3 | 0.01 | 0.98 | 81 |
| 111 | A-1 | 0.01 | 0.97 | 83 |
| 112 | A-3 | 0.01 | 0.98 | 82 |
| 113 | A-1 | 0.01 | 0.98 | 84 |
| 114 | A-3 | 0.01 | 0.97 | 83 |
| 115 | A-29 | 0.01 | 0.98 | 85 |
| 116 | A-30 | 0.01 | 0.98 | 86 |
| 001 | None | 0 | 1.0 | 70 |
| 002 | A-10 | 0.0001 | 1.0 | 71 |
| 003 | A-10 | 1.0 | 0.78 | 69 |
| 004 | TBA | 0.01 | 0.95 | 58 |
| 005 | DEA | 0.01 | 0.95 | 56 |
| 001c | None | 0 | 0.80 | 76 |
| 801c | A-1 | 0.01 | 0.82 | 82 |
| 802c | A-10 | 0.01 | 0.82 | 82 |
| 901s | A-10 | 0.01 | 0.96 | 73 |
| 902s | A-10 | 0.01 | 0.96 | 65 |

Remarks: TBA means tributylamine, and DEA means diethylaniline. Samples 001c, 801c and 802c were prepared in the same manner as above except a graphite powder was employed as the negative electrode material. Samples 901s and 902s were prepared using the same amount of propylene carbonate and dioxane, respectively, in place of the combination of diethyl carbonate and ethylene carbonate.

TABLE 2

| Sample | Amine compound | Concentration (mol/L) | Initial capacity | Cycle life (%) |
|---|---|---|---|---|
| 201 | B-1 | 0.01 | 0.99 | 82 |
| 202 | B-3 | 0.01 | 0.97 | 82 |
| 203 | B-4 | 0.01 | 0.98 | 83 |
| 204 | B-5 | 0.01 | 0.98 | 83 |
| 205 | B-7 | 0.01 | 0.97 | 82 |
| 206 | B-10 | 0.001 | 1.0 | 81 |
| 207 | B-10 | 0.01 | 0.98 | 83 |
| 208 | B-10 | 0.05 | 0.97 | 82 |
| 209 | B-13 | 0.01 | 0.98 | 81 |
| 210 | B-14 | 0.01 | 0.98 | 81 |

TABLE 2-continued

| Sample | Amine compound | Concentration (mol/L) | Initial capacity | Cycle life (%) |
|---|---|---|---|---|
| 211 | B-15 | 0.01 | 0.97 | 83 |
| 212 | B-17 | 0.01 | 0.98 | 82 |
| 213 | B-19 | 0.01 | 0.98 | 83 |
| 001 | None | 0 | 1.0 | 70 |
| 012 | B-10 | 0.0001 | 1.0 | 71 |
| 013 | B-10 | 1.0 | 0.78 | 69 |
| 001c | None | 0 | 0.80 | 76 |
| 811c | B-1 | 0.01 | 0.82 | 82 |
| 812c | B-10 | 0.01 | 0.82 | 82 |

Remarks: Samples 001c, 811c and 812c were prepared in the same manner as above except a graphite powder was employed as the negative electrode material.

TABLE 3

| Sample | Amine compound | Concentration (mol/L) | Initial capacity | Cycle life (%) |
|---|---|---|---|---|
| 301 | C-1 | 0.01 | 0.99 | 83 |
| 302 | C-4 | 0.01 | 0.98 | 82 |
| 303 | C-7 | 0.01 | 0.97 | 83 |
| 304 | C-10 | 0.001 | 0.99 | 82 |
| 305 | C-10 | 0.01 | 0.98 | 83 |
| 306 | C-10 | 0.05 | 0.97 | 83 |
| 307 | C-19 | 0.01 | 0.98 | 82 |
| 308 | D-1 | 0.001 | 0.99 | 81 |
| 309 | D-1 | 0.01 | 0.98 | 82 |
| 310 | D-1 | 0.05 | 0.98 | 81 |
| 311 | D-3 | 0.01 | 0.97 | 83 |
| 312 | D-7 | 0.01 | 0.98 | 82 |
| 001 | None | 0 | 1.0 | 70 |
| 022 | C-10 | 0.0001 | 1.0 | 70 |
| 023 | C-10 | 1.0 | 0.78 | 68 |
| 001c | None | 0 | 0.80 | 76 |
| 821c | C-10 | 0.01 | 0.82 | 82 |
| 822c | D-1 | 0.01 | 0.82 | 82 |

Remarks: Samples 001c, 821c and 822c were prepared in the same manner as above except a graphite powder was employed as the negative electrode material.

TABLE 4

| Sample | Amine compound | Concentration (mol/L) | Initial capacity | Cycle life (%) |
|---|---|---|---|---|
| 401 | E-1 | 0.01 | 0.99 | 83 |
| 402 | E-3 | 0.01 | 0.98 | 82 |
| 403 | E-4 | 0.01 | 0.97 | 83 |
| 404 | E-5 | 0.01 | 0.98 | 82 |
| 405 | E-7 | 0.01 | 0.97 | 83 |
| 406 | E-10 | 0.001 | 1.0 | 81 |
| 407 | E-10 | 0.01 | 0.98 | 83 |
| 408 | E-10 | 0.05 | 0.97 | 82 |
| 409 | E-13 | 0.01 | 0.99 | 82 |
| 410 | E-14 | 0.01 | 0.98 | 81 |
| 411 | E-15 | 0.01 | 0.97 | 83 |
| 412 | E-17 | 0.01 | 9.98 | 82 |
| 413 | E-19 | 0.01 | 0.98 | 84 |
| 414 | E-22 | 0.01 | 0.97 | 83 |
| 415 | E-27 | 0.01 | 0.99 | 86 |
| 416 | E-28 | 0.01 | 0.99 | 86 |
| 417 | E-32 | 0.01 | 0.99 | 86 |
| 001 | None | 0 | 1.0 | 70 |
| 032 | E-10 | 0.0001 | 1.0 | 71 |
| 033 | E-10 | 0.01 | 0.78 | 69 |
| 001c | None | 0 | 0.80 | 76 |
| 831c | E-1 | 0.01 | 0.82 | 82 |
| 832c | E-10 | 0.01 | 0.82 | 82 |

Remarks: Samples 001c, 831c and 832c were prepared in the same manner as above except a graphite powder was employed as the negative electrode material.

TABLE 5

| Sample | Amine compound | Concentration (mol/L) | Initial capacity | Cycle life (%) |
|---|---|---|---|---|
| 501 | F-1 | 0.01 | 1.0 | 83 |
| 502 | F-4 | 0.01 | 0.98 | 82 |
| 503 | F-7 | 0.01 | 0.97 | 83 |
| 504 | F-10 | 0.001 | 0.98 | 82 |
| 505 | F-10 | 0.01 | 0.97 | 83 |
| 506 | F-10 | 0.05 | 0.97 | 83 |
| 507 | F-19 | 0.01 | 0.98 | 82 |
| 508 | G-1 | 0.001 | 1.0 | 81 |
| 509 | G-1 | 0.01 | 0.99 | 82 |
| 510 | G-1 | 0.05 | 0.97 | 81 |
| 511 | G-3 | 0.01 | 0.97 | 83 |
| 512 | G-7 | 0.01 | 0.98 | 82 |
| 001 | None | 0 | 1.0 | 70 |
| 042 | F-10 | 0.0001 | 1.0 | 70 |
| 043 | F-10 | 1.0 | 0.78 | 68 |
| 001c | None | 0 | 0.80 | 76 |
| 841c | F-1 | 0.01 | 0.82 | 82 |
| 842c | G-1 | 0.01 | 0.82 | 82 |

Remarks: Samples 001ac 841c and 842c were prepared in the same manner as above except a graphite powder was employed as the negative electrode material.

TABLE 6

| Sample | Amine compound | Concentration (mol/L) | Initial capacity | Cycle life (%) |
|---|---|---|---|---|
| 601 | A-10 | 0.001 | | |
| | E-10 | 0.001 | 1.00 | 65 |
| 602 | A-10 | 0.005 | | |
| | E-10 | 0.005 | 1.00 | 75 |
| 603 | A-10 | 0.01 | | |
| | E-10 | 0.01 | 1.01 | 69 |
| 604 | A-10 | 0.005 | | |
| | E-7 | 0.005 | 1.00 | 75 |
| 605 | A-10 | 0.005 | | |
| | E-1 | 0.005 | 1.00 | 70 |
| 606 | A-10 | 0.005 | | |
| | E-36 | 0.005 | 1.00 | 74 |
| 607 | A-10 | 0.005 | | |
| | E-40 | 0.005 | 1.02 | 69 |
| 608 | A-7 | 0.005 | | |
| | E-10 | 0.005 | 1.01 | 73 |
| 609 | A-23 | 0.005 | | |
| | E-10 | 0.005 | 1.01 | 74 |
| 610 | A-36 | 0.005 | | |
| | E-10 | 0.005 | 1.01 | 70 |
| 611 | A-37 | 0.005 | | |
| | E-10 | 0.005 | 1.00 | 7i |
| 612 | A-10 | 0.005 | | |
| | E-1 | 0.005 | 1.00 | 68 |

TABLE 7

| Sample | Amine compound | Concentration (mol/L) | Initial capacity | Cycle life (%) |
|---|---|---|---|---|
| 701 | A-10 | 0.001 | | |
| | E-10 | 0.001 | 0.81 | 69 |
| 702 | A-10 | 0.005 | | |
| | E-10 | 0.005 | 0.80 | 73 |
| 703 | A-10 | 0.01 | | |
| | E-10 | 0.01 | 0.80 | 66 |
| 704 | A-10 | 0.005 | | |
| | E-7 | 0.005 | 0.81 | 73 |
| 705 | A-10 | 0.005 | | |
| | E-1 | 0.005 | 0.81 | 68 |
| 706 | A-10 | 0.005 | | |
| | E-36 | 0.005 | 0.80 | 74 |
| 707 | A-10 | 0.005 | | |
| | E-40 | 0.005 | 0.80 | 70 |
| 708 | A-7 | 0.005 | | |
| | E-10 | 0.005 | 0.80 | 73 |
| 709 | A-23 | 0.005 | | |
| | E-10 | 0.005 | 0.80 | 74 |
| 710 | A-36 | 0.005 | | |
| | E-10 | 0.005 | 0.80 | 68 |
| 711 | A-37 | 0.005 | | |
| | E-10 | 0.005 | 0.81 | 68 |
| 712 | A-10 | 0.005 | | |
| | E-1 | 0.005 | 1.00 | 67 |

Remarks: Samples 701 to 712 were prepared in the same manner as above except a graphite powder was employed as the negative electrode material.

EXAMPLE 2

The procedures of Example 1 were repeated except that 120 mg of a strip of lithium metal foil was placed on 1 g of the coated negative electrode material mixture layer on the negative electrode sheet, and the metal foil and the negative electrode material mixture were brought into electric contact to each other, and the coating amount of the positive electrode active material was changed into 240 g/m².

Almost the same results as in Example 1 were obtained.

What is claimed is:

1. A non-aqueous lithium ion secondary battery comprising a positive electrode and a negative electrode which are capable of reciprocally receiving and releasing lithium ions, a non-aqueous electrolyte solution containig a lithium salt in a non-aqueous solvent and a separator in a sealed case, wherein the non-aqueous electrolyte solution further contains at least one amine compound selected from the group consisting of N-arylcarbazole compound, an N-arylphenothiazine compound and an N-arylphenoxazine compound in an amount of more than 0.0001 mole/L but not more than 0.1 mole/L.

2. The non-aqueous lithium ion secondary battery of claim 1, wherein the amine compound is present in the non-aqueous electrolyte solution in an amount of 0.001 to 10% by weight of the lithium salt in the non-aqueous electrolyte solution.

3. The non-aqueous lithium ion secondary battery of claim 1, wherein the amine compound is present in the non-aqueous electrolyte solution in an amount of 0.001 to 0.1 mole/L.

4. The non-aqueous lithium ion secondary battery of claim 1, wherein the non-aqueous electrolyte solution further contains a triarylamine compound in a molar amount of 1/9 to 9/1 based on the amount of the amine compound.

5. The non-aqueous lithium ion secondary battery of claim 1, wherein the non-aqueous solvent comprises a non-cyclic carbonate compound and a cyclic carbonate compound in a weight ratio of 1/9 to 9/1.

6. The non-aqueous lithium ion secondary battery of claim 1, wherein the non-aqueous sol-vent comprises a non-cyclic carbonate compound and ethylene carbonate in a weight ratio of 1/9 to 9/1.

7. The non-aqueous lithium ion secondary battery of claim 1, wherein the lithium salt comprises $LiBF_4$, $LiPF_6$, or a combination thereof.

8. The non-aqueous lithium ion secondary battery of claim 1, wherein the negative electrode comprises a compound having the formula (1):

$$M^1M^2_pM^4_qM^6_r \qquad (1)$$

in which $M^1$ and $M^2$ are different from each other and each represents at least one atom selected from the group consisting of Si, Ge, Sn, Pb, P, B, Al, and Sb; $M^4$ represents at least one atom selected from the group consisting of Li, Na, K, Rb, Cs, Mg, Ca, Sr, and Ba; $M^6$ represents at least one atom selected from the group consisting of O, S, and Te; each of p and q is a number of 0.001 to 10; and r is a number of 1.00 to 50.

9. A non-aqueous lithium ion secondary battery comprising a positive electrode and a negative electrode which are capable of reciprocally receiving and releasing lithium ions, a non-aqueous electrolyte solution containing a lithium salt in a non-aqueous solvent and a separator in a sealed case, wherein the non-aqueous electrolyte solution further contains at least one triarylamine compound in an amount of more than 0.0001 mole/L but not more than 0.1 mole/L and the non-aqueous solvent comprises a non-cyclic carbonate compound and a cyclic carbonate compound in a weight ratio of 1/9 to 9/1.

10. The non-aqueous lithium ion secondary battery of claim 9, wherein the triarylamine compound is present in the non-aqueous electrolyte solution in an amount of 0.001 to 10% by weight of the lithium salt in the non-aqueous electrolyte solution.

11. The non-aqueous lithium ion secondary battery of claim 9, wherein the triarylamine compound is present in the non-aqueous electrolyte solution in an amount of 0.001 to 0.1 mole/L.

12. The non-aqueous lithium ion secondary battery of claim 9, wherein the cyclic carbonate compound is ethylene carbonate.

13. The non-aqueous lithium ion secondary battery of claim 9, wherein the lithium salt comprises $LiBF_4$, $LiPF_6$, or a combination thereof.

14. The non-aqueous lithium ion secondary battery of claim 9, wherein the negative electrode comprises a compound having the formula (1):

$$M^1M^2_pM^4_qM^6_r \qquad (1)$$

in which $M^1$ and $M^2$ are different from each other and each represents at least one atom selected from the group consisting of Si, Ge, Sn, Pb, P, B, Al, and Sb; $M^4$ represents at least one atom selected from the group consisting of Li, Na, K, Rb, Cs, Mg, Ca, Sr, and Ba; $M^6$ represents at least one atom selected from the group consisting of O, S, and Te; each of p and q is a number of 0.001 to 10; and r is a number of 1.00 to 50.

* * * * *